US012561150B2

(12) United States Patent
Moeller-Bertram et al.

(10) Patent No.: US 12,561,150 B2
(45) Date of Patent: *Feb. 24, 2026

(54) SYSTEM AND METHOD FOR AUTOMATED MULTIUSER INTERFACE CUSTOMIZATION

(71) Applicant: Lifekind System LLC, Scottsdale, AZ (US)

(72) Inventors: Tobias Moeller-Bertram, San Diego, CA (US); Michael Kirk Hall, Redington Shores, FL (US); Ronald Renfrow, III, San Diego, CA (US); Jameson Giebler, Nixa, MO (US); Jan Mirko Schilling, San Diego, CA (US); Laurie Lidstrom, Durango, CO (US)

(73) Assignee: Lifekind System LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,170

(22) Filed: May 10, 2024

(65) Prior Publication Data

US 2024/0296057 A1 Sep. 5, 2024

Related U.S. Application Data

(63) Continuation of application No. 18/072,832, filed on Dec. 1, 2022, now Pat. No. 12,079,645.

(60) Provisional application No. 63/284,958, filed on Dec. 1, 2021.

(51) Int. Cl.
*G06F 9/451* (2018.01)

(52) U.S. Cl.
CPC ..................................... *G06F 9/451* (2018.02)

(58) Field of Classification Search
CPC ...................................................... G06F 9/451
See application file for complete search history.

(56) References Cited

U.S. PATENT DOCUMENTS

| | | | |
|---|---|---|---|
| 7,676,505 B2 * | 3/2010 | Chess | .................... G06F 16/954 |
| | | | 707/999.203 |
| 2017/0262164 A1 * | 9/2017 | Jain | ...................... G06F 3/04847 |
| 2019/0302975 A1 * | 10/2019 | Rydzewski | ......... G06F 16/9535 |

* cited by examiner

*Primary Examiner* — KC Chen
(74) *Attorney, Agent, or Firm* — MUGHAL GAUDRY & FRANKLIN PC

(57) ABSTRACT

Systems and methods for automated generation and customization of interfaces are disclosed herein. The method includes receiving a request to launch an interface and identifying a subject of the interface and a viewing user of the interface. Based on attributes of one or both of the subject and the viewing user, a page is selected and customized. One or several containers associated with the page are identified. Data associated with the containers is retrieved and customized, and the container is likewise customized. A customized view is generated based on the customized page, the customized one or more containers, and the customized data.

20 Claims, 15 Drawing Sheets

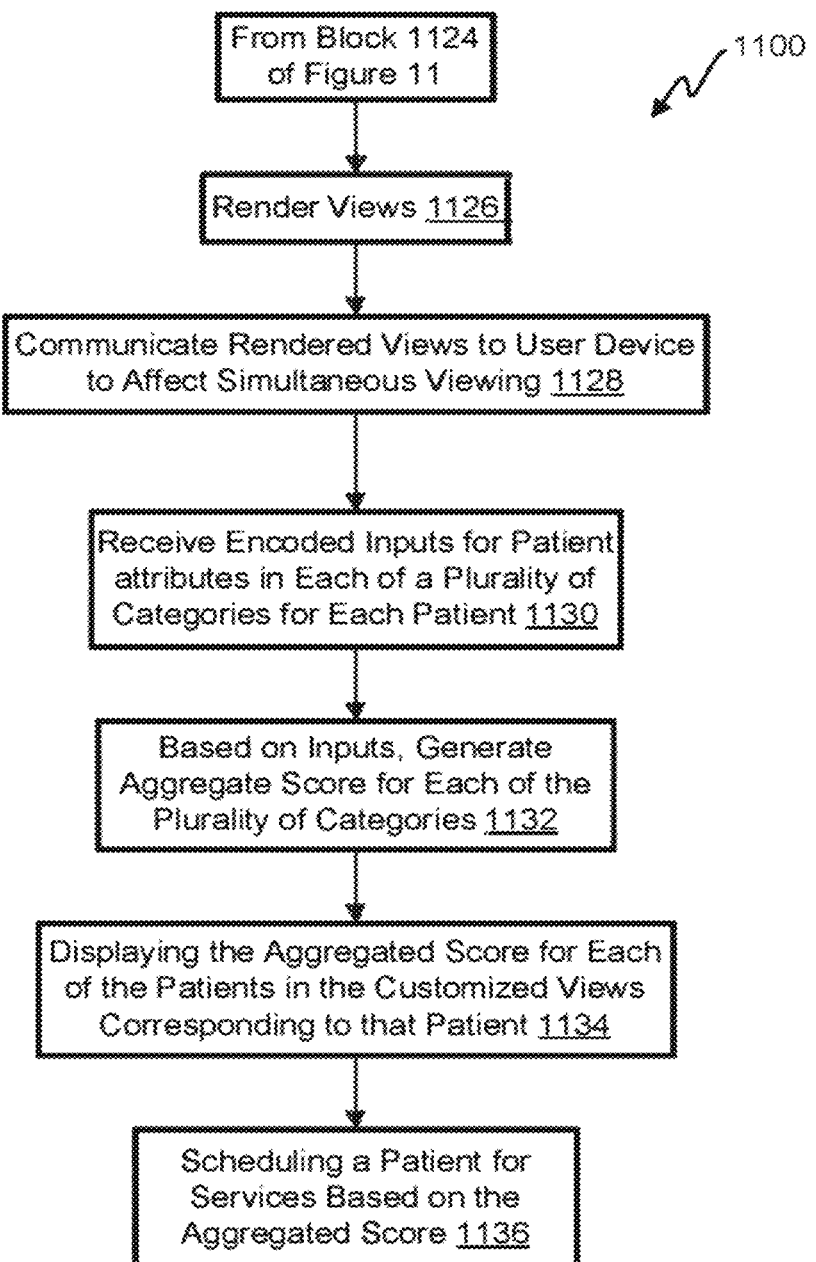

From Block 1124
of Figure 11

1100

Render Views 1126

Communicate Rendered Views to User Device
to Affect Simultaneous Viewing 1128

Receive Encoded Inputs for Patient
attributes in Each of a Plurality of
Categories for Each Patient 1130

Based on Inputs, Generate
Aggregate Score for Each of the
Plurality of Categories 1132

Displaying the Aggregated Score for Each
of the Patients in the Customized Views
Corresponding to that Patient 1134

Scheduling a Patient for
Services Based on the
Aggregated Score 1136

SYSTEM AND METHOD FOR AUTOMATED MULTIUSER INTERFACE CUSTOMIZATION

PRIORITY

This application is a continuation of U.S. patent application Ser. No. 18/072,832, entitled "SYSTEM AND METHOD FOR AUTOMATED MULTIUSER INTERFACE CUSTOMIZATION." filed Dec. 1, 2022, now U.S. Pat. No. 12,079,645, issued Sep. 3, 2024, which claims benefit of U.S. Patent Provisional Application No. 63/284, 958, entitled "SYSTEM AND METHOD FOR AUTOMATED MULTIUSER INTERFACE CUSTOMIZATION," filed Dec. 1, 2021, the disclosure of which is incorporated by reference herein in its entirety.

BACKGROUND

A computer network, or data network, is a digital telecommunications network, which allows nodes to share resources. In computer networks, computing devices exchange data with each other using connections between nodes (data links.) These data links are established over cable media such as wires or optic cables, or wireless media such as WiFi.

Network computer devices that originate, route, and terminate the data are called network nodes. Nodes can include hosts such as personal computers, phones, servers as well as networking hardware. Two such devices may be networked together when one device is able to exchange information with the other device, whether or not they have a direct connection to each other. In most cases, application-specific communications protocols are layered (i.e. carried as payload) over other more general communications protocols. This formidable collection of information technology requires skilled network management to keep it all running reliably.

Computer networks are increasingly used in diverse applications. However, many current networks do not adequately address issues arising in an increasingly digital world. Accordingly, new and improved systems, methods, and devices are desired.

BRIEF SUMMARY OF THE INVENTION

Aspects of the present disclosure relate to method of generating a scrum interface. The method includes receiving a request for launch of a scrum interface, the scrum interface including a plurality of unique views within the scrum interface and identifying a plurality of viewing users. In some embodiments, a unique view can be generated for each of the plurality of viewing user. The method can include identifying a subject of the scrum interface, which data relating to the subject of the scrum interface can be displayed via the plurality of unique views to the viewing users, based on attributes of the viewing user and attributes of the subject, identifying a page, executing a page policy to thereby retrieve and customize page data, identifying and retrieving at least one container relevant to the identified page, executing a container policy to thereby retrieve and customize container data, forming the unique view for the viewing user based on the customized page data and the customized container data, and delivering the unique view to a user device of the viewing user.

In some embodiments, the method can include rendering the unique view. In some embodiments, rendering the unique view includes converting the unique view into HTML. In some embodiments, the method can include controlling simultaneous viewing of the plurality of unique views by the plurality of viewing users. In some embodiments the method can include receiving a coded input from at least one of the viewing users. In some embodiments, the coded input is received from the at least one of the viewing users via the unique view of that at least one of the viewing users.

In some embodiments the method can include receiving a coded input via a unique view displayed on a user device of each of the plurality of users. In some embodiments, each of the coded inputs identifies a plurality of attributes of the subject of the scrum interface. In some embodiments the method includes generating an aggregate score for the subject based on the received coded inputs. In some embodiments the method includes modifying the plurality of unique views to display the aggregate score.

One aspect of the present disclosure relates to a system for generating a scrum interface. The system includes memory including stored instructions and at least one processor. The at least one processor can execute the stored instructions to receive a request for launch of a scrum interface, the scrum interface can include a plurality of unique views within the scrum interface, identify a plurality of viewing users, each of which unique views is generated for each of the plurality of viewing user, identify a subject of the scrum interface, which data relating to the subject of the scrum interface is displayed via the plurality of unique views to the viewing users, based on attributes of the viewing user and attributes of the subject, identify a page, execute a page policy to thereby retrieve and customize page data, identify and retrieve at least one container relevant to the identified page, execute a container policy to thereby retrieve and customize container data, form the unique view for the viewing user based on the customized page data and the customized container data, and deliver the unique view to a user device of the viewing user.

In some embodiments, the at least one processor can render the unique view. In some embodiments, rendering the unique view includes converting the unique view into HTML. In some embodiments, the at least one processor can control simultaneous viewing of the plurality of unique views by the plurality of viewing users. In some embodiments, the at least one processor can receive a coded input from at least one of the viewing users. In some embodiments, the coded input is received from the at least one of the viewing users via the unique view of that at least one of the viewing users.

In some embodiments, the at least one processor can receive a coded input via a unique view displayed on a user device of each of the plurality of users. In some embodiments, each of the coded inputs identifies a plurality of attributes of the subject of the scrum interface. In some embodiments, the at least one processor can generate an aggregate score for the subject based on the received coded inputs. In some embodiments, the at least one processor can modify the plurality of unique views to display the aggregate score.

One aspect of the present disclosure relates to a method of generating an assessment interface. The method includes receiving a request to launch an assessment interface, receiving information for a subject of the assessment interface, identifying assessment procedures and pages associated with the identified assessment procedures, generating a customized view for each of the identified and associated pages, receiving input subject data for a viewing user from a user device via the customized views, storing subject data in as database server, which subject data is stored in a subject profile database in the database server, generating a characterization score for the subject based on the subject data, which characterization score characterizes multi-dimensional attributes of the subject, automatically generating a procedure program based on the characterization score, providing services according to a service program, the service program generated based at least in part on the characterization score, receiving inputs subsequent to the providing of services according to the service program, updating subject data in the subject profile database with the inputs received subsequent to the providing of services, and generating an updated characterization score based on the updated subject data.

In some embodiments, the subject of the assessment interface can be a new patient. In some embodiments the method includes defining uniqueness of each point of subject data according to multi-dimensional categories, and automatically generating a procedure program based on the characterization score. In some embodiments, automatically generating the procedure program includes: ingesting the characterization score into a machine learning model. In some embodiments, automatically generating the procedure program includes: ingesting the characterization score into a machine learning model.

In some embodiments the method includes rendering the customized views. In some embodiments, rendering the customized views includes converting the customized view into html. In some embodiments, generating the customized view includes selecting one of the pages, executing a page policy of that selected one of the pages to thereby retrieve and customize page data, identifying and retrieving at least one container relevant to the selected one of the pages, executing a container policy of the at least one container relevant to the selected one of the pages to thereby retrieve and customize container data, and forming the customized view for the viewing user based on the customized page data and the customized container data. In some embodiments, the request to launch the assessment interface is received by a server from a user device. In some embodiments, the service program can be a medical treatment.

One aspect of the present disclosure relates to a system for generating an assessment interface. The system can include memory including stored instructions and at least one processor. The at least processor can execute stored instructions to receive a request to launch an assessment interface, receive information for a subject of the assessment interface, identify assessment procedures and pages associated with the identified assessment procedures, generate a customized view for each of the identified and associated pages, receive input subject data for a viewing user from a user device via the customized views, store subject data in as database server, wherein the subject data is stored in a subject profile database in the database server, generate a characterization score for the subject based on the subject data, which characterization score characterizes multi-dimensional attributes of the subject, automatically generate a procedure program based on the characterization score, provide services according to a service program, the service program generated based at least in part on the characterization score, receive inputs subsequent to the providing of services according to the service program, update subject data in the subject profile database with the inputs received subsequent to the providing of services, and generate an updated characterization score based on the updated subject data.

In some embodiments, the subject of the assessment interface comprises a new patient. In some embodiments, the at least one processor can define uniqueness of each point of subject data according to multi-dimensional categories, and automatically generate a procedure program based on the characterization score. In some embodiments, automatically generating the procedure program includes ingesting the characterization score into a machine learning model. In some embodiments, automatically generating the procedure program includes ingesting the characterization score into a machine learning model.

In some embodiments, the at least one processor can render the customized views. In some embodiments, rendering the customized views includes converting the customized view into html. In some embodiments, generating the customized view includes selecting one of the pages, executing a page policy of that selected one of the pages to thereby retrieve and customize page data, identifying and retrieving at least one container relevant to the selected one of the pages, executing a container policy of the at least one container relevant to the selected one of the pages to thereby retrieve and customize container data, and forming the customized view for the viewing user based on the customized page data and the customized container data. In some embodiments, the request to launch the assessment interface is received by a server from a user device. In some embodiments, the service program can include a medical treatment.

One aspect of the present disclosure relates to a method of generating a subject across time and space interface. The method can include receiving a request to launch a subject across time and space interface from a viewing user, receiving information for a subject of the subject across time and space interface, identifying a page corresponding to the requested subject across time and space interface, customizing the identified page, executing a workflow of at least one container associated with the identified page, which execution of the workflow triggers identification and retrieval of container data and identification of at least one control associated with the container, customizing the at least one control based on attributes of at least one of the subject and the viewing user, generating a customized view for the identified page based on the customized control, the at least one container, and the customized identified page, and outputting the customized view to a user device.

In some embodiments, the request to launch the subject across time and space interface is received from the user device. In some embodiments the method includes receiving information relating to the viewing user, which information relating to the viewing user identifies at least one attribute of the viewing user. In some embodiments, the attribute of the viewing user includes at least one of an identity of the viewing user, a role of the viewing user, and a location of the viewing user.

In some embodiments the method includes rendering the customized view. In some embodiments, rendering the customized view includes converting the customized view into HTML. In some embodiments the method includes executing a workflow of the identified page. In some embodiments, executing the workflow of the identified page includes identifying at least on container of the identified page, and identifying data of the identified page.

In some embodiments the method includes customizing the at least one container. In some embodiments, the at least one container is customized based on at least one characteristic of: the viewing user or the subject.

One aspect of the present disclosure relates to a system for generating a subject across time and space interface. The system can include a memory including stored instructions, and at least one processor. The at least one processor can execute the stored instructions to receive a request to launch a subject across time and space interface from a viewing user, receive information for a subject of the subject across time and space interface, identify a page corresponding to the requested subject across time and space interface, customize the identified page, execute a workflow of at least one container associated with the identified page, which execution of the workflow triggers identification and retrieval of container data and identification of at least one control associated with the container, customize the at least one control based on attributes of at least one of the subject and the viewing user, generate a customized view for the identified page based on the customized control, the at least one container, and the customized identified page, and output the customized view to a user device.

In some embodiments, the request to launch the subject across time and space interface is received from the user device. In some embodiments, the at least one processor can receive information relating to the viewing user, which information relating to the viewing user identifies at least one attribute of the viewing user. In some embodiments, the attribute of the viewing user includes at least one of an identity of the viewing user, a role of the viewing user, and a location of the viewing user.

In some embodiments, the at least one processor can render the customized view. In some embodiments, rendering the customized view includes converting the customized view into HTML. In some embodiments, the at least one processor can execute a workflow of the identified page. In some embodiments, executing the workflow of the identified page includes identifying at least on container of the identified page, and identifying data of the identified page.

In some embodiments, the at least one processor can customize the at least one container. In some embodiments, the at least one container is customized based on at least one characteristic of: the viewing user or the subject.

One aspect of the present disclosure relates to a method of automated generation of a visualization tool within a customized user interface. The method includes receiving a request to launch a visualization tool within a customized user interface from a viewing user, receiving information for a subject of the visualization tool within the customized user interface, identifying a page corresponding to the requested subject across time and space interface, identifying and customizing an avatar container, the avatar container including policies for generation of an avatar representation of the subject, identifying and customizing a timeline container, the timeline container including policies for generation of a timeline representation of a history of the subject, generating a customized visualization tool view for the identified page based on the customized avatar container and based on the customized timeline container, receiving an input indicative of an event affecting the subject via one of: the avatar and the timeline, updating subject data in a subject profile database with the received input, and updating the other of the avatar and the timeline to graphically depict the inputted event.

In some embodiments, the input indicative of the event affecting the subject is received via the avatar. In some embodiments, the method includes identifying a location of the event on the avatar, and receiving inputs indicative of at least one attribute of the event. In some embodiments, the method includes updating the avatar to indicate the location of the event on the avatar. In some embodiments, the method includes receiving information indicative of a time of the event. In some embodiments, updating the other of the avatar and the timeline to graphically depict the inputted event includes updating the timeline to graphically depict the time of the event.

In some embodiments, the input indicative of the event affecting the subject is received via the timeline. In some embodiments the method includes identifying a time of the event, and receiving inputs indicative of at least one attribute of the event. In some embodiments, the method includes updating the timeline to indicate the event on the timeline. In some embodiments, the method includes receiving information indicative of a location of the event on the avatar. In some embodiments, updating the other of the avatar and the timeline to graphically depict the inputted event includes updating the avatar to graphically depict the location of the event on the avatar. In some embodiments, the avatar is generated based on a body scan.

One aspect of the present disclosure relates to a system of automated generation of a visualization tool within a customized user interface. The system includes memory including stored instructions, and at least one processor that can execute the stored instructions. The at least one processor can receive a request to launch a visualization tool within a customized user interface from a viewing user, receive information for a subject of the visualization tool within the customized user interface, identify a page corresponding to the requested subject across time and space interface, identify and customizing an avatar container, the avatar container including policies for generation of an avatar representation of the subject, identify and customizing a timeline container, the timeline container including policies for generation of a timeline representation of a history of the subject, generate a customized visualization tool view for the identified page based on the customized avatar container and based on the customized timeline container, receive an input indicative of an event affecting the subject via one of: the avatar and the timeline, update subject data in a subject profile database with the received input, and update the other of the avatar and the timeline to graphically depict the inputted event.

In some embodiments, the input indicative of the event affecting the subject is received via the avatar. In some embodiments, the at least one processor can identify a location of the event on the avatar, and receive inputs indicative of at least one attribute of the event. In some embodiments, the at least one processor can update the avatar to indicate the location of the event on the avatar. In some embodiments, the at least one processor can receive information indicative of a time of the event.

In some embodiments, updating the other of the avatar and the timeline to graphically depict the inputted event includes updating the timeline to graphically depict the time of the event. In some embodiments, the input indicative of the event affecting the subject is received via the timeline. In some embodiments, the at least one processor can identify a time of the event, and receive inputs indicative of at least one attribute of the event. In some embodiments, the at least one processor can update the timeline to indicate the event on the timeline. In some embodiments, the at least one processor can receive information indicative of a location of the event on the avatar. In some embodiments, updating the other of the avatar and the timeline to graphically depict the inputted event includes updating the avatar to graphically depict the location of the event on the avatar. In some embodiments, the avatar is generated based on a body scan.

BRIEF DESCRIPTION OF THE DRAWINGS

FIG. 12 is a flowchart illustrating a second portion of one embodiment of a process for generating a scrum interface and a plurality of unique views within the scrum interface.

Figure 1:
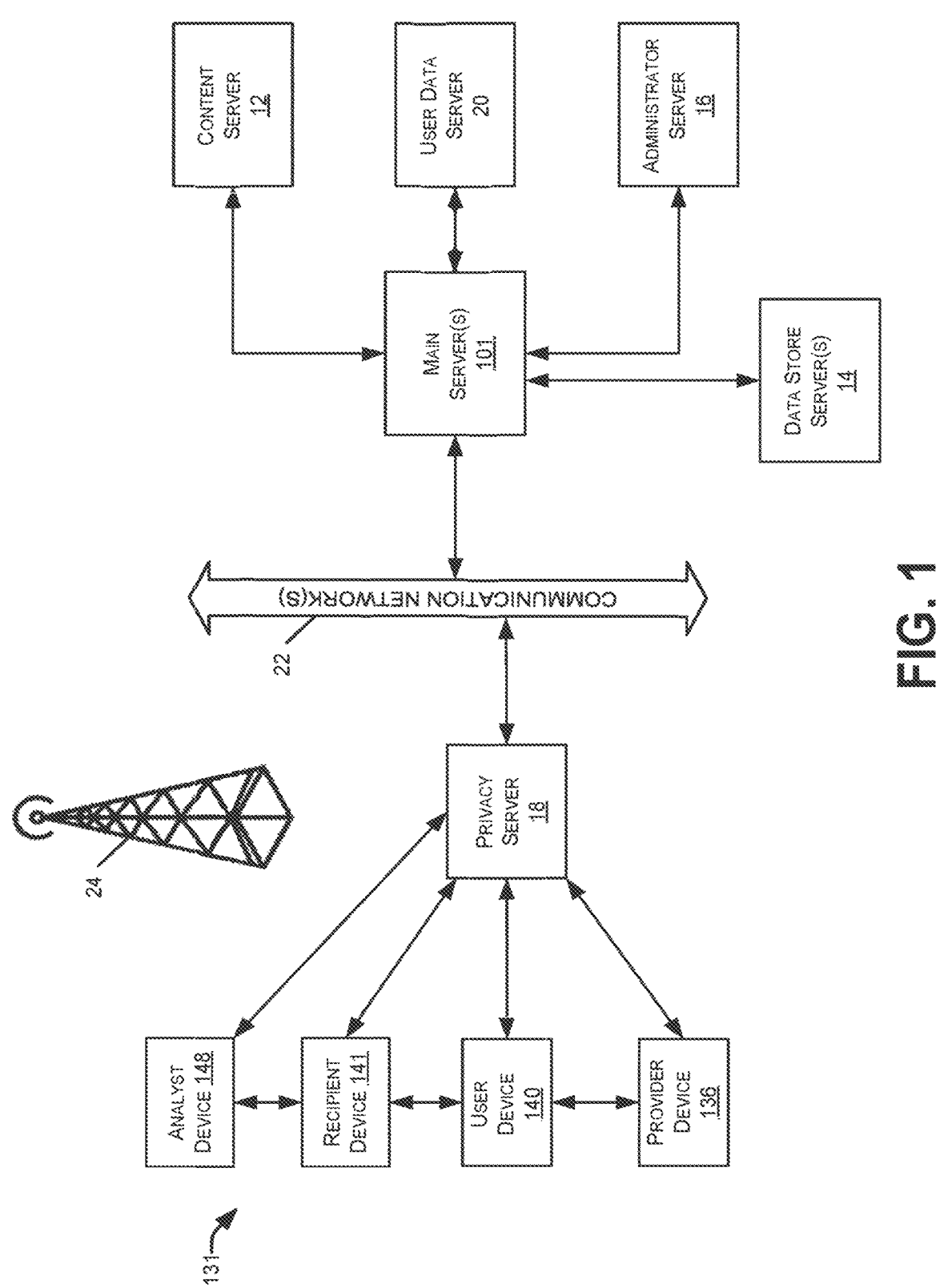
FIG. 1 is a block diagram illustrating various components of an automated customization and generation network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Some aspects of the present disclosure relate to new methods, systems, and/or devices automatic generation and configuration of a user interface and/or of a webpage. This can be according to a tiered structure of pages, data, containers, and controls, some or all of which can include executable procedures. Execution of the procedures associated with a page and its associated data, containers, and/or controls can aggregate data that can be rendered by a framework from data into code, such as HTML code. This data, which can be medical data, can, for example, relate to one or several patients, treatments, medications, service providers, schedules, locations, or the like. The framework can be configured for rendering pages, data, containers, and/or controls relating to the medical field. In some embodiments, this can include one or several features configured to secure information relating to one or several patients.

In some embodiments, the automated generation and/or configuration of the user interface and/or the webpage can be based on one or several variables. These variables can include, for example, a user, a user attribute, a time, a location, an activity, or the like. The customization can occur at one or several levels in the generation of the user interface and/or webpage. For example, the customization can be at the page level, at the data level, at the container level, and/or at the control level.

Some aspects of the present disclosure relate to the generation of one or several specific interfaces and/or interface functionalities. Each of these represents an improvement over current interfaces in how they are created and automatically customized to the viewer/user of the interface. This customization can include the automatic filtration and/or de-identification of one or several desired classes of data. For example, this customization can include the automatic filtration and/or de-identification of any protected patient or treatment data. In some embodiments, this customization can be based on the user, one or several user attributes, a time, a location, and activity, or the like.

In some embodiments, the generation of the interface can include the simultaneous generation of multiple custom views. In some embodiments the multiple custom views can include at least one custom view for each of a plurality of users simultaneously accessing the same page. In some embodiments, the same page can comprise information relating to a same set of patients such as, for example, the same one or several patients, information relating to the same set of treatments, information relating to a same set of locations, information relating to a same set of times, or the like. In some embodiments, for example, a scrum interface can be generated. The scrum interface can enable multiple users to view information relating to the same one or several patients. The scrum interface can include at least one custom view generated for each of the multiple users. This custom view can be customized based on the user, one or several attributes of the user, the one or several patients, a location, a time, or the like. In some embodiments, this customization can include auto generation and/or auto selection of text that can be displayed to the user through the user interface. In some embodiments, this text can be auto generated and/or auto selected to correspond with the user and/or with one or several attributes of the user.

In some embodiments the generation of the interface can include the generation of an assessment/evaluation interface through which patient information can be received and/or ingested. The assessment/evaluation interface can be customized based on information relating to the patient on which assessment/evaluation is being performed and/or based on information relating to the user of the assessment/evaluation interface. In some embodiments, the assessment/evaluation interface can be customized based on information being gathered by the user in the assessment/evaluation. Information can be gathered via the assessment/evaluation interface, which information can be used to generate a patient health score. The patient health score and/or the information gathered via assessment/evaluation can be used to generate a treatment program for the patient. In some embodiments, the generation of the treatment program can be automatically, for example, a machine learning model. The treatment can be provided to the patient which can result in the gathering and more information relating to the patient, the inputting of that information into the interface, and the generation of an updated health score.

In some embodiments, the generation of the interface can include the generation of a subject interface tracking the patient across space and time, which subject can be a patient. In some embodiments, in response to receive a request launched interface the user in one or several attributes of user can be identified and the interface can be generated and launched.

In some embodiments, generation of the interface can include generation of a visualization tool. This can include generating an avatar representative of a user, which user can be a patient, and a timeline. The avatar can be, in some embodiments, based on data gathered from the user, including, for example, photo data, video data, scan data, input data, or the like. In some embodiments, this input data can include, for example, data characterizing one or several measurements relevant to the user including, for example, user height, weight, arm measurements, leg measurements, torso measurements, abdominal measurements, or the like. In some embodiments, the avatar can include the user's face, eye color, skin color, hair color and/or hairstyle, or the like.

In some embodiments, a second user, which second user can be the user, can enter information into the user interface via the avatar and/or the timeline. In some embodiments, for example, the second user can enter information for an event in the timeline, the location of the event in the timeline characterizing the time of the occurrence of the event. In some embodiments, the second user can enter information for an event with the avatar. The information can be entered in association with a portion of the avatar such as, for example, in association with the left elbow, or the lower right torso. In some embodiments, information relating to an event can be entered into one or both of the timeline and the avatar.

With reference now to FIG. 1, a block diagram is shown illustrating various components of an automated generation network 10 which implements and supports certain embodiments and features described herein. In some embodiments, the automated generation network 10 can comprise one or several physical components and/or one or several virtual components such as, for example, one or several cloud computing components. In some embodiments, the automated generation network 10 can comprise a mixture of physical and cloud computing components.

Automated generation network 10 may include one or more main servers 101. As discussed below in more detail, main servers 101 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Main server 101 may include one or more server farms, clusters, or any other appropriate arrangement and/or combination or computer servers. Main server 101 may act according to stored instructions located in a memory subsystem of the server 101, and may run an operating system, including any commercially available server operating system and/or any other operating systems discussed herein.

The automated generation network 10 may include one or more data store servers 14, such as database servers and file-based storage systems. The database servers 14 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 14, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives.

In some embodiments, the one or several hardware and/or software components of the database server 14 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 14 may comprise stored data relevant to the functions of the automated generation network 10. Illustrative examples of data stores 14 that may be maintained in certain embodiments of the automated generation network 10 are described throughout the application. In some embodiments, multiple data stores may reside on a single server 14, either using the same storage components of server 14 or using different physical storage components to assure data security and integrity between data stores. In other embodiments, each data store may have a separate dedicated data store server 14. In some embodiments, these data stores can include information for display in one or several interfaces, which information can include, for example, information relating to one or several patients, one or several treatments, one or several locations, one or several providers, or the like. In some embodiments, these stores can include information relating to the generation of one or several interfaces and/or used in the generation of one or several interfaces. This information can include, for example, one or several controls, containers, pages, scripts, rules, or the like.

Automated generation network 10 also may devices 131, which devices 131 can include one or more provider devices 136, also referred to herein as source devices 136, user devices 140, recipient devices 141, and/or analyst devices 148. Source devices 136, user devices 140, recipient devices 141, and analyst devices 148 may display content received via the automated generation network 10, and may support various types of user interactions with the content. Source devices 136, user devices 140, recipient devices 141, and analyst devices 148 may include mobile devices such as smartphones, tablet computers, personal digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other source devices 136, user devices 140, recipient devices 141, and analyst devices 148 may be general purpose personal computers or special-purpose computing devices including, by way of example, personal computers, laptop computers, workstation computers, projection devices, and interactive room display systems. Additionally, source devices 136, user devices 140, recipient devices 141, and analyst devices 148 may be any other electronic devices, such as a thin-client computers, an Internet-enabled gaming systems, business or home appliances, and/or a personal messaging devices, capable of communicating over network(s) 22.

In different contexts of automated generation networks 10, source devices 136, user devices 140, recipient devices 141, and analyst devices 148 may correspond to different types of specialized devices, for example, clinician devices, patient devices and analyst devices in an care provisioning network and/or care management network, employee devices and presentation devices in a company network, different gaming devices in a gaming network, etc. In some embodiments, source devices 136, user devices 140, recipient devices 141, and analyst devices 148 may operate in the same physical location, such as in a clinic, exam room, surgical room, etc. In such cases, the devices may contain components that support direct communications with other nearby devices, such as wireless transceivers and wireless communications interfaces, Ethernet sockets or other Local Area Network (LAN) interfaces, etc. In other implementations, the source devices 136, user devices 140, recipient devices 141, and analyst devices 148 need not be used at the same location, but may be used in remote geographic locations in which each source device 136, user device 140, recipient devices 141, and analyst device 148 may use security features and/or specialized hardware (e.g., hardware-accelerated SSL and HTTPS, WS-Security, firewalls, etc.) to communicate with the main server 101 and/or other remotely located devices 136, 140, 141, 148. Additionally, different source devices 136, user devices 140, recipient devices 141, and analyst devices 148 may be assigned different designated roles, such as presenter devices, user devices, source devices, analyst devices, or the like, and in such cases the different devices may be provided with additional hardware and/or software components to provide content and support user capabilities not available to the other devices.

In some embodiments the automated generation network 10 may automatically generate one or several user interfaces customized to one or several users. These can include, for example, the creation of one or several user interfaces for use in a scrum setting. The scrum setting may comprise a plurality of users viewing information relating to a same thing or set of things. Specifically, the scrum setting may comprise a plurality of user viewing information relating to a single patient or to a set of patients. Although each of the users in the plurality of users are viewing information relating to the same patient or to the same set of patients, each of the users may have a custom user interface which can prevent information customized to that user and/or to an attribute of that user. Thus, in some embodiments, one or several of devices 136, 140, 141, 148 may interact with each other in a scrum type setting, each presenting information via a custom user interface to a user of that device 136, 140, 141, 148.

The automated generation network 10 also may include a privacy server 18 that maintains private user information at the privacy server 18 while using applications or services hosted on other servers. For example, the privacy server 18 may be used to maintain private data of a user within one jurisdiction even though the user is accessing an application hosted on a server (e.g., the main server 101) located outside the jurisdiction. In such cases, the privacy server 18 may intercept communications between a source device 136, a user device 140, and/or analyst device 148 and other devices that include private user information. The privacy server 18 may create a token or identifier that does not disclose the private information and may use the token or identifier when communicating with the other servers and systems, instead of using the user's private information.

As illustrated in FIG. 1, the main server 101 may be in communication with one or more additional servers, such as a content server 12, a user data server 20, and/or an administrator server 16. Each of these servers may include some or all of the same physical and logical components as the main server(s) 101, and in some cases, the hardware and software components of these servers 12, 16, 20 may be incorporated into the main server(s) 101, rather than being implemented as separate computer servers.

Content server 12 may include hardware and software components to generate, store, and maintain the content resources for distribution to user devices 140 and other devices in the network 10. In some embodiments, the content server can store information relating to the generation of one or several interfaces and/or used in the generation of one or several interfaces. This information can include, for example, one or several controls, containers, pages, scripts, rules, or the like User data server 20 may include hardware and software components that store and process data for multiple users relating to each user's activities and usage of the automated generation network 10. For example, the main server 101 may record and track each user's system usage, including their source device 136, user device 140, and/or analyst device 148, content resources accessed, and interactions with other source devices 136, user devices 140, and/or analyst devices 148. In some embodiments, the data stored by the user data server 20 can include data relating to one or several individuals and/or users of the automated generation network 10. These individuals can include, for example, one or several administrators, one or several patients, one or several service providers, which can be medical service providers, or the like.

In some embodiments, information relating to a patient can include all or portions of the patient's medical history. This can include, for example, information identifying the patient and/or identifying one or several attributes of the patient. These attributes can include, for example: social circumstances; individual behavior and personal; medical care, genetics, and biology; environment; and other.

In some embodiments, social circumstances can include, for example, key relationships (spouse/partner, parents, children, care givers, close friends, emergency contacts), social network (groups, clubs, church, gangs, etc.), and/or languages (native, fluent, proficient, etc.). In some embodiments, individual behavior and personal can include, for example, dict, alcohol and non-prescription drug use, physical activity, sleep routine and variability, education, scheduling preferences (best times, worst times), sports interests, favorites: music, food, color, artist, band, car, vacation spot, time of day, place to relax, etc., hobbies, and/or preferred provider settings (sex, age, experience, personality traits). In some embodiments, medical care, genetics, and biology can include, for example, medical history, major and/or minor historical health events, family history of genetically influenced disease. In some embodiments, environment can include, for example, housing, employment history, work and recreational exposure to hazardous chemicals, and/or home town. In some embodiments, other can include life changing event. In some embodiments, these can include events that have severe impacts on social circumstances and/or individual behavior including accidents, acute illness with ongoing impacts, traumatic experiences, etc.

In some embodiments, the user data server 20 can include information relating to one or several medical service providers. In some embodiments, this can be in the form of a profile such that each medical service provider can have an associated profile. This profile can include information relating to the medical service provider including, for example, the name of the medical service provider, location of the medical service provider types of services provided by the medical service provider, education, access level to information contained within the automated generation network 10, language and/or language proficiency, reading level, or the like.

In some embodiments, the information contained in the user data server 20 can be displayed in one or several generated user interfaces, and/or in some embodiments, information contained in the user data server 20 can be used in generating one or several user interfaces. In one embodiment, for example, a medical service provider may request information relating to a patient. A user interface or a view can be created by the automated generation network 10 based on a combination of information relating to the medical service provider and relating to the patient. For example, based on the services provided by the medical service provider and/or based on the medical service provider's access level, content relating to the patient can be included in the user interface or can be withheld from the user interface. In some embodiments, and based on a language and/or language proficiency of the medical service provider, one or several narratives can be custom generated to match the medical service providers language and/or language proficiency.

Administrator server 16 may include hardware and software components to initiate various administrative functions at the main server 101 and other components within the automated generation network 10. For example, the administrator server 16 may monitor device status and performance for the various servers, data stores, and/or user devices 136, 140, 141, 148 in the automated generation network 10. When necessary, the administrator server 16 may add or remove devices from the network 10, and perform device maintenance such as providing software updates to the devices in the network 10. Various administrative tools on the administrator server 16 may allow authorized users to set user access permissions to various content resources, monitor resource usage by users and devices 136, 140, 141, 148, and perform analyses and generate reports on specific network users and/or devices (e.g., resource usage tracking reports, training evaluations, etc.).

The automated generation network 10 may include one or more communication networks 22. Although only a single network 22 is identified in FIG. 1, the automated generation network 10 may include any number of different communication networks between any of the computer servers and devices shown in FIG. 1 and/or other devices described herein. Communication networks 22 may enable communication between the various computing devices, servers, and other components of the automated generation network 10. As discussed below, various implementations of automated generation networks 10 may employ different types of networks 22, for example, computer networks, telecommunications networks, wireless networks, and/or any combination of these and/or other networks.

The automated generation network 10 may include one or several navigation systems or features including, for example, the Global Positioning System ("GPS"), GALILEO (e.g., Europe's global positioning system), or the like, or location systems or features including, for example, one or several transceivers that can determine location of the one or several components of the automated generation network 10 via, for example, triangulation. All of these are depicted as navigation system 24.

In some embodiments, navigation system 24 can include or several features that can communicate with one or several components of the automated generation network 10 including, for example, with one or several of the source devices 136, with one or several of the user devices 140, and/or with one or several of the analyst devices 148. In some embodiments, this communication can include the transmission of a signal from the navigation system 24 which signal is received by one or several components of the automated generation network 10 and can be used to determine the location of the one or several components of the automated generation network 10.

Figure 2:
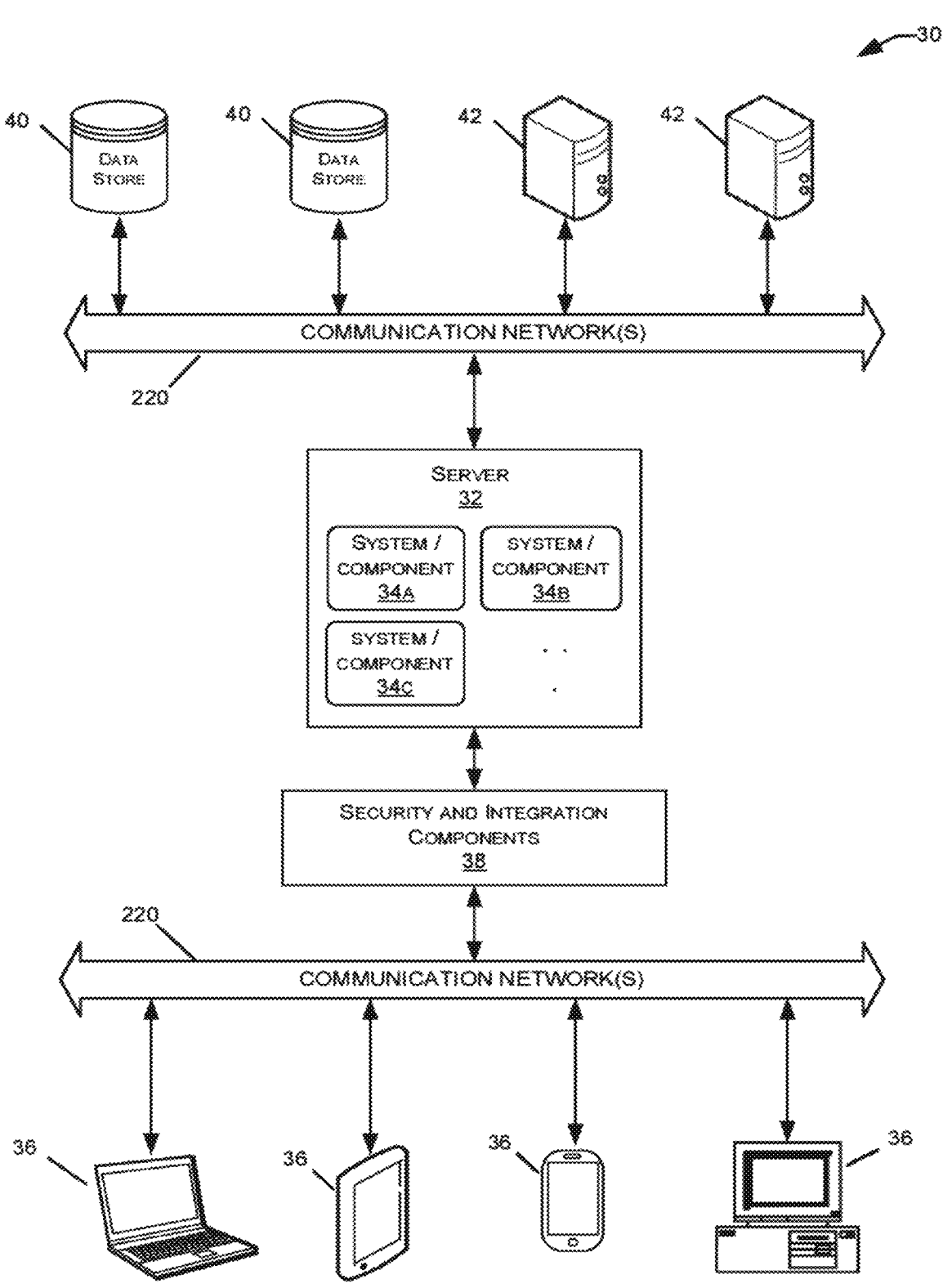
FIG. 2 is a schematic illustration of one embodiment of a distributed computing environment.

With reference to FIG. 2, an illustrative distributed computing environment 30 is shown including a computer server 32, four client computing devices 36, and other components that may implement certain embodiments and features described herein. In some embodiments, the server 32 may correspond to the main server 101 discussed above in FIG. 1, and the client computing devices 36 may correspond to one or more of the source devices 136, the user devices 140, recipient devices 141, and/or the analyst devices 148. However, the computing environment 30 illustrated in FIG. 2 may correspond to any other combination of devices and servers configured to implement a client-server model or other distributed computing architecture.

Client devices 36 may be configured to receive and execute client applications over one or more networks 44. Such client applications may be web browser based applications and/or standalone software applications, such as mobile device applications. Server 32 may be communicatively coupled with the client devices 36 via one or more communication networks 44. Client devices 36 may receive client applications from server 32 or from other application providers (e.g., public or private application stores). Server 32 may be configured to run one or more server software applications or services, for example, web-based or cloud-based services, to support content distribution and interaction with client devices 36. Users operating client devices 36 may in turn utilize one or more client applications (e.g., virtual client applications) to interact with server 32 to utilize the services provided by these components.

Various different subsystems and/or components 34 may be implemented on server 32. Users operating the client devices 36 may initiate one or more client applications to use services provided by these subsystems and components. The subsystems and components within the server 32 and client devices 36 may be implemented in hardware, firmware, software, or combinations thereof. Various different system configurations are possible in different distributed computing systems 30 and automated generation networks 10. The embodiment shown in FIG. 2 is thus one example of a distributed computing system and is not intended to be limiting.

Although exemplary computing environment 30 is shown with four client computing devices 36, any number of client computing devices may be supported. Other devices, such as specialized sensor devices, etc., may interact with client devices 36 and/or server 32.

As shown in FIG. 2, various security and integration components 38 may be used to send and manage communications between the server 32 and user devices 36 over one or more communication networks 44. The security and integration components 38 may include separate servers, such as web servers and/or authentication servers, and/or specialized networking components, such as firewalls, routers, gateways, load balancers, and the like. In some cases, the security and integration components 38 may correspond to a set of dedicated hardware and/or software operating at the same physical location and under the control of the same entities as server 32. For example, components 38 may include one or more dedicated web servers and network hardware in a datacenter or a cloud infrastructure. In other examples, the security and integration components 38 may correspond to separate hardware and software components which may be operated at a separate physical location and/or by a separate entity.

Security and integration components 38 may implement various security features for data transmission and storage, such as authenticating users and restricting access to unknown or unauthorized users. In various implementations, security and integration components 38 may provide, for example, a file-based integration scheme or a service-based integration scheme for transmitting data between the various devices in the automated generation network 10. Security and integration components 38 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 38 and/or elsewhere within the automated generation network 10. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 32 and user devices 36. SSL or TLS may use HTTP or HTTPS to provide authentication and confidentiality. In other examples, web services may be implemented using REST over HTTPS with the OAuth open standard for authentication, or using the WS-Security standard that provides for secure SOAP (e.g., Simple Object Access Protocol) messages using Extensible Markup Language (XML) encryption. In other examples, the security and integration components 38 may include specialized hardware for providing secure web services. For example, security and integration components 38 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 44 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 44 may be local area networks (LAN), such as one based on Ethernet, Token-Ring, and/or the like. Network(s) 44 also may be wide-area networks, such as the Internet. Networks 44 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 44.

Computing environment 30 also may include one or more data stores 40 and/or back-end servers 42. In certain examples, the data stores 40 may correspond to data store server(s) 14 discussed above in FIG. 1, and back-end servers 42 may correspond to the various back-end servers 12, 14, 16, 20. Data stores 40 and servers 42 may reside in the same datacenter or may operate at a remote location from server 32. In some cases, one or more data stores 40 may reside on a non-transitory storage medium within the server 32. Other data stores 40 and back-end servers 42 may be remote from server 32 and configured to communicate with server 32 via one or more networks 44. In certain embodiments, data stores 40 and back-end servers 42 may reside in a storage-area network (SAN), or may use storage-as-a-service (STaaS) architectural model.

Figure 3:
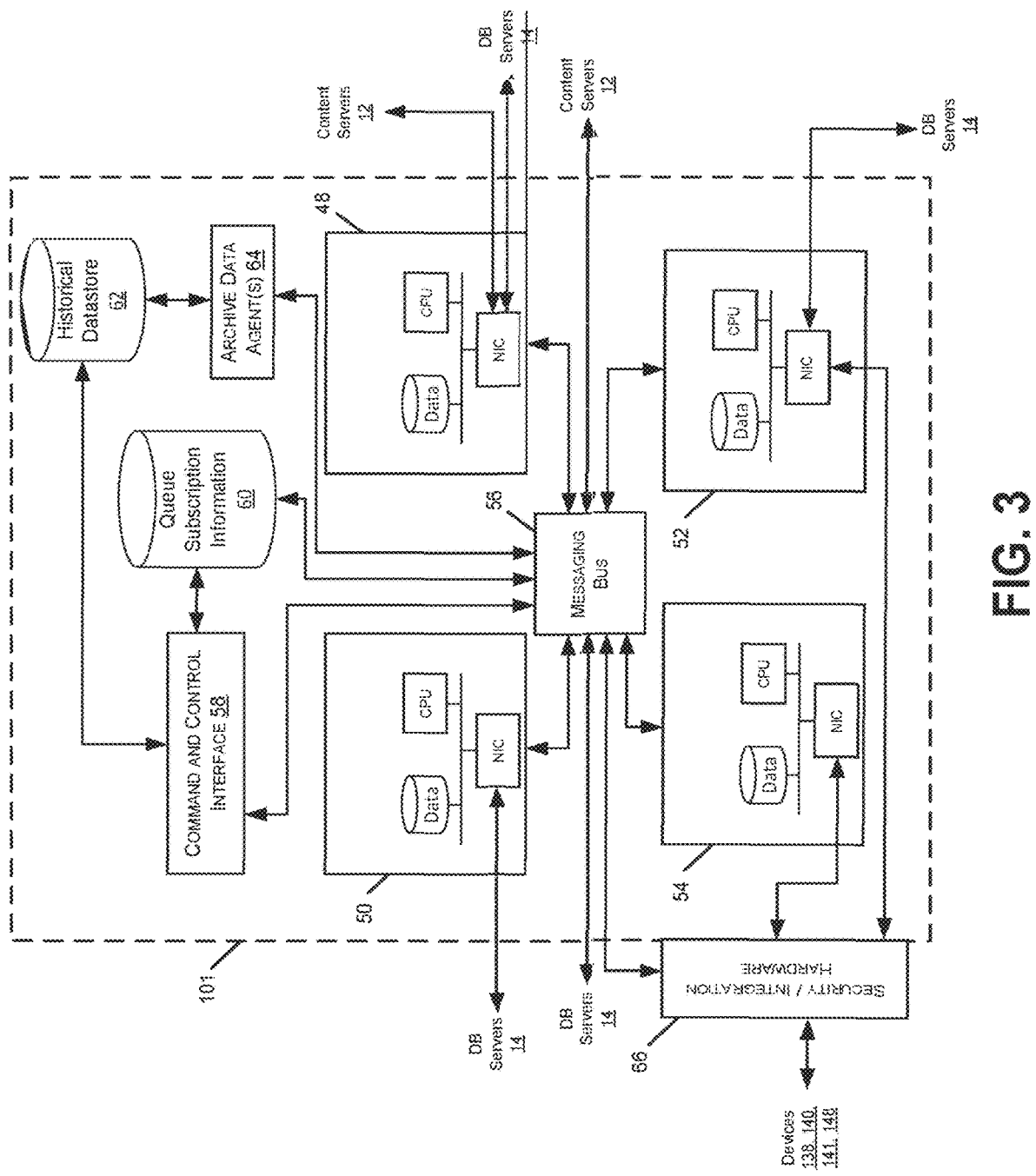
FIG. 3 is a schematic illustration of one embodiment of a server of the automated generation network.

With reference now to FIG. 3, a block diagram is shown illustrating an embodiment of one or more main servers 101 within an automated generation network 10. In such an embodiment, main server 101 performs internal data gathering and processing of streamed content along with external data gathering and processing. Other embodiments could have either all external or all internal data gathering. This embodiment allows reporting timely information that might be of interest to the reporting party or other parties. In this embodiment, the main server 101 can monitor gathered information from several sources to allow it to make timely business and/or processing decisions based upon that information. For example, reports of user actions and/or responses, as well as the status and/or results of one or several processing tasks could be gathered and reported to the main server 101 from a number of sources.

Internally, the main server 101 gathers information from one or more internal components 48-54. The internal components 48-54 gather and/or process information relating to such things as: services provided to patient-users, also referred to herein as subject-users; data gathered from patient-users; inputs from provider-users; inputs provided by recipient-users, patient-user state; patient-user characteristics; patient-user progress; etc. The internal components 48-54 can report the gathered and/or generated information in real-time, near real-time or along another time line. To account for any delay in reporting information, a time stamp or staleness indicator can inform others of how timely the information was sampled. The main server 101 can opt to allow third parties to use internally or externally gathered information that is aggregated within the server 101 by subscription to the automated generation network 10.

A command and control (CC) interface 58 configures the gathered input information to an output of data streams, also referred to herein as content streams. APIs for accepting gathered information and providing data streams are provided to third parties external to the server 101 who want to subscribe to data streams. The server 101 or a third party can design as yet undefined APIs using the CC interface 58. The server 101 can also define authorization and authentication parameters using the CC interface 58 such as authentication, authorization, login, and/or data encryption. CC information is passed to the internal components 48-54 and/or other components of the automated generation network 10 through a channel separate from the gathered information or data stream in this embodiment, but other embodiments could embed CC information in these communication channels. The CC information allows throttling information reporting frequency, specifying formats for information and data streams, deactivation of one or several internal components 48-54 and/or other components of the automated generation network 10, updating authentication and authorization, etc.

The various data streams that are available can be researched and explored through the CC interface 58. Those data stream selections for a particular subscriber, which can be one or several of the internal components 48-54 and/or other components of the automated generation network 10, are stored in the queue subscription information database 60. The server 101 and/or the CC interface 58 then routes selected data streams to processing subscribers that have selected delivery of a given data stream. Additionally, the server 101 also supports historical queries of the various data streams that are stored in a historical data store 62 as gathered by an archive data agent 64. Through the CC interface 58 various data streams can be selected for archiving into the historical data store 62.

Components of the automated generation network 10 outside of the server 101 can also gather information that is reported to the server 101 in real-time, near real-time, or along another time line. There is a defined API between those components and the server 101. Each type of information or variable collected by server 101 falls within a defined API or multiple APIs. In some cases, the CC interface 58 is used to define additional variables to modify an API that might be of use to processing subscribers. The additional variables can be passed to all processing subscribers or just a subset of the processing subscribers. For example, a component of the automated generation network 10 outside of the server 101 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with the response reported to that component. Encryption and/or unique addressing of data streams or sub-streams can be used to hide the private variables within the messaging queues.

The source devices 136, user devices 140, and/or analyst devices 148 communicate with the server 101 through security and/or integration hardware 66. The communication with security and/or integration hardware 66 can be encrypted or not. For example, a socket using a TCP connection could be used. In addition to TCP, other transport layer protocols like Control Transmission Protocol (SCTP) and User Datagram Protocol (UDP) could be used in some embodiments to intake the gathered information. A protocol such as SSL could be used to protect the information over the TCP connection. Authentication and authorization can be performed to any user devices 140 and/or supervisor device interfacing to the server 101. The security and/or integration hardware 66 receives the information from one or several of the user devices 140 and/or the analyst devices 148 by providing the API and any encryption, authorization, and/or authentication. In some cases, the security and/or integration hardware 66 reformats or rearranges this received information The messaging bus 56, also referred to herein as a messaging queue or a messaging channel, can receive information from the internal components of the server 101 and/or components of the automated generation network 10 outside of the server 101 and distribute the gathered information as a data stream to any processing subscribers that have requested the data stream from the messaging queue 56. As indicated in FIG. 3, processing subscribers are indicated by a connector to the messaging bus 56, the connector having an arrow head pointing away from the messaging bus 56. In some examples, only data streams within the messaging queue 56 that a particular processing subscriber has subscribed to may be read by that processing subscriber if received at all. Gathered information sent to the messaging queue 56 is processed and returned in a data stream in a fraction of a second by the messaging queue 56. Various multicasting and routing techniques can be used to distribute a data stream from the messaging queue 56 that a number of processing subscribers have requested. Protocols such as Multicast or multiple Unicast could be used to distributed streams within the messaging queue 56. Additionally, transport layer protocols like TCP, SCTP and UDP could be used in various embodiments.

Through the CC interface 58, an external or internal processing subscriber can be assigned one or more data streams within the messaging queue 56. A data stream is a particular type of messages in a particular category. For example, a data stream can comprise all of the data reported to the messaging bus 56 by a designated set of components. One or more processing subscribers could subscribe and receive the data stream to process the information and make a decision and/or feed the output from the processing as gathered information fed back into the messaging queue 56. Through the CC interface 58 a developer can search the available data streams or specify a new data stream and its API. The new data stream might be determined by processing a number of existing data streams with a processing subscriber.

The automated generation network 10 has internal processing subscribers 48-54 that process assigned data streams to perform functions within the server 101. Internal processing subscribers 48-54 could perform functions such as: identifying and/or tracking services provided to patient-users; gathering data from patient-users; gathering data from provider-users; identifying and/or tracking patient-user state; identifying and/or tracking one or several patient-user characteristics; identifying and/or tracking patient-user progress; recommending services and/or user actions; or the like. The internal processing subscribers 48-54 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 48-54 may additionally process one or more data streams to provide different information to feed back into the messaging queue 56 to be part of a different data stream. For example, hundreds of user devices 140 could provide responses that are put into a data stream on the messaging queue 56. An internal processing subscriber 48-54 could receive the data stream and process it to determine the difficulty of one or several data packets provided to one or several users and supply this information back onto the messaging queue 56 for possible use by other internal and external processing subscribers.

As mentioned above, the CC interface 58 allows the automated generation network 10 to query historical messaging queue 56 information. An archive data agent 64 listens to the messaging queue 56 to store data streams in a historical database 62. The historical database 62 may store data streams for varying amounts of time and may not store all data streams. Different data streams may be stored for different amounts of time.

With regard to the components 48-54, the main server(s) 101 may include various server hardware and software components that manage the content resources within the automated generation network 10 and provide interactive and adaptive content to users on various user devices 140. For example, main server(s) 101 may provide instructions to and receive information from the other devices within the automated generation network 10, in order to manage and transmit content resources, user data, and server or client applications executing within the network 10.

Figure 4:
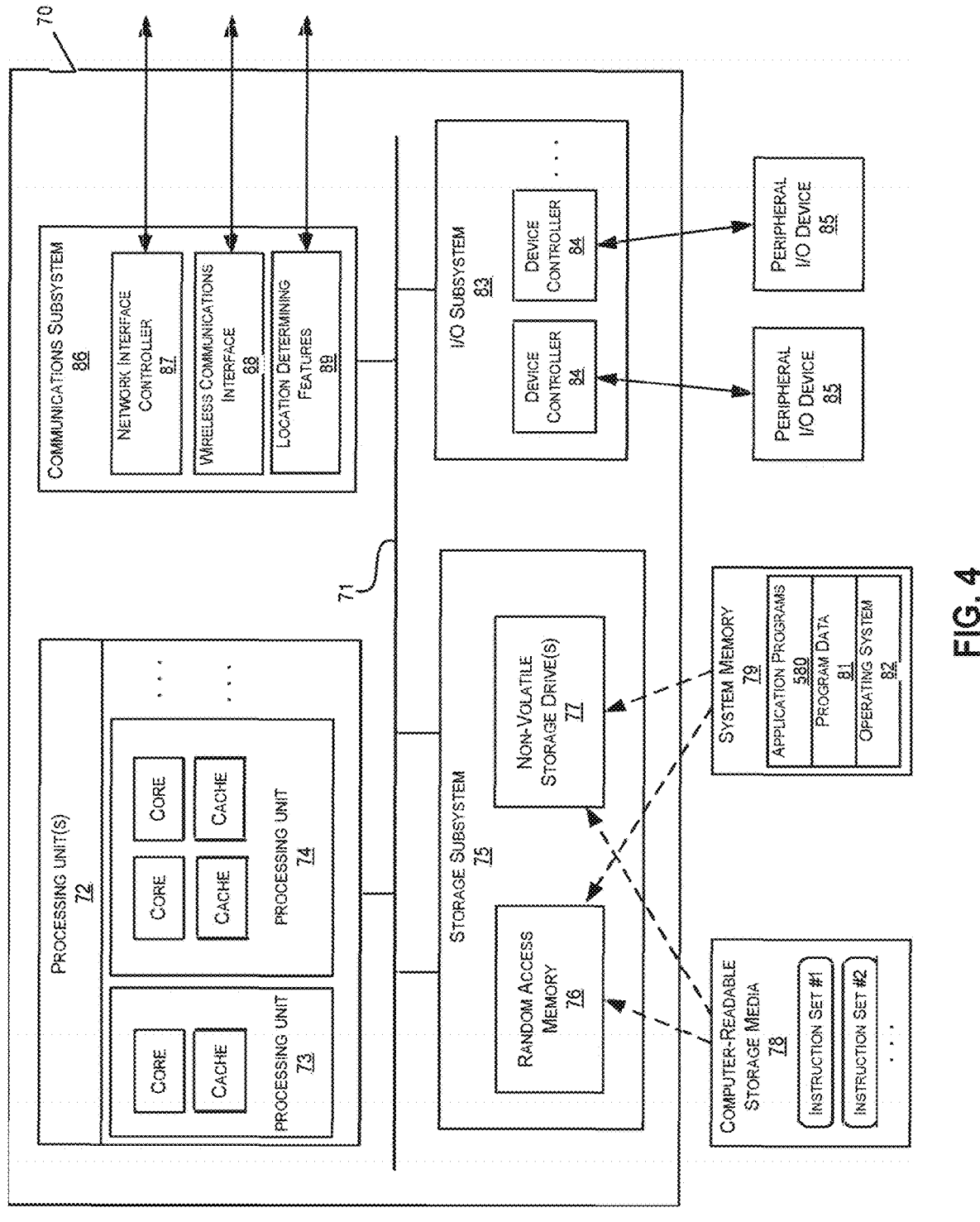
FIG. 4 is a schematic illustration of one embodiment of a computer system.

With reference now to FIG. 4, a block diagram of an illustrative computer system is shown. The system 70 may correspond to any of the computing devices or servers of the automated generation network 10 described above, or any other computing devices described herein, and specifically can include, for example, one or several of the source devices 136, one or several of the user devices 140, and/or one or several of the analyst device 148, and/or any of the servers 101, 12, 14, 16, 18, 20. In this example, computer system 70 includes processing units 72 that communicate with a number of peripheral subsystems via a bus subsystem

71. These peripheral subsystems include, for example, a storage subsystem 75, an I/O subsystem 83, and a communications subsystem 86.

Bus subsystem 71 provides a mechanism for letting the various components and subsystems of computer system 70 communicate with each other as intended. Although bus subsystem 71 is shown schematically as a single bus, alternative embodiments of the bus subsystem may utilize multiple buses. Bus subsystem 71 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 72, which may be implemented as one or more integrated circuits (e.g., a conventional microprocessor or microcontroller), controls the operation of computer system 70. One or more processors, including single core and/or multicore processors, may be included in processing unit 72. As shown in the figure, processing unit 72 may be implemented as one or more independent processing units 73 and/or 74 with single or multicore processors and processor caches included in each processing unit. In other embodiments, processing unit 72 may also be implemented as a quad-core processing unit or larger multicore designs (e.g., hexa-core processors, octo-core processors, ten-core processors, or greater.

Processing unit 72 may execute a variety of software processes embodied in program code, and may maintain multiple concurrently executing programs or processes. At any given time, some or all of the program code to be executed can be resident in processor(s) 72 and/or in storage subsystem 75. In some embodiments, computer system 70 may include one or more specialized processors, such as digital signal processors (DSPs), outboard processors, graphics processors, application-specific processors, and/or the like.

I/O subsystem 83 may include device controllers 84 for one or more user interface input devices and/or user interface output devices 85. User interface input and output devices 85 may be integral with the computer system 70 (e.g., integrated audio/video systems, and/or touchscreen displays), or may be separate peripheral devices that are attachable/detachable from the computer system 70. The I/O subsystem 83 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 85 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 85 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 85 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 85 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 70 to a user or other computer. For example, output devices 85 may include, without limitation, a variety of display devices that visually convey text, graphics, and audio/video information such as monitors, printers, speakers, headphones, automotive navigation systems, plotters, voice output devices, and modems.

Computer system 70 may comprise one or more storage subsystems 75, comprising hardware and software components used for storing data and program instructions, such as system memory 79 and computer-readable storage media 78. The system memory 79 and/or computer-readable storage media 78 may store program instructions that are loadable and executable on processing units 72, as well as data generated during the execution of these programs.

Depending on the configuration and type of computer system 70, system memory 79 may be stored in volatile memory (such as random access memory (RAM) 76) and/or in non-volatile storage drives 77 (such as read-only memory (ROM), flash memory, etc.). The RAM 76 may contain data and/or program modules that are immediately accessible to and/or presently being operated and executed by processing units 72. In some implementations, system memory 79 may include multiple different types of memory, such as static random access memory (SRAM) or dynamic random access memory (DRAM). In some implementations, a basic input/output system (BIOS), containing the basic routines that help to transfer information between elements within computer system 70, such as during start-up, may typically be stored in the non-volatile storage drives 77. By way of example, and not limitation, system memory 79 may include application programs 80, such as client applications, Web browsers, mid-tier applications, server applications, etc., program data 81, and an operating system 82.

Storage subsystem 75 also may provide one or more tangible computer-readable storage media 78 for storing the basic programming and data constructs that provide the functionality of some embodiments. Software (programs, code modules, instructions) that when executed by a processor provide the functionality described herein may be stored in storage subsystem 75. These software modules or instructions may be executed by processing units 72. Storage subsystem 75 may also provide a repository for storing data used in accordance with the present invention.

Storage subsystem 75 may also include a computer-readable storage media reader that can further be connected to computer-readable storage media 78. Together and, optionally, in combination with system memory 79, computer-readable storage media 78 may comprehensively represent remote, local, fixed, and/or removable storage devices plus storage media for temporarily and/or more permanently containing, storing, transmitting, and retrieving computer-readable information.

Computer-readable storage media 78 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 70.

By way of example, computer-readable storage media 78 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 78 may include, but is not limited to, Zip® drives, flash memory cards, universal serial bus (USB) flash drives, secure digital (SD) cards, DVD disks, digital video tape, and the like. Computer-readable storage media 78 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 70.

Communications subsystem 86 may provide a communication interface from computer system 70 and external computing devices via one or more communication networks, including local area networks (LANs), wide area networks (WANs) (e.g., the Internet), and various wireless telecommunications networks. As illustrated in FIG. 4, the communications subsystem 86 may include, for example, one or more network interface controllers (NICs) 87, such as Ethernet cards, Asynchronous Transfer Mode NICs, Token Ring NICs, and the like, as well as one or more wireless communications interfaces 88, such as wireless network interface controllers (WNICs), wireless network adapters, and the like. As illustrated in FIG. 4, the communications subsystem 86 may include, for example, one or more location determining features 89 such as one or several navigation system features and/or receivers, and the like. Additionally and/or alternatively, the communications subsystem 86 may include one or more modems (telephone, satellite, cable, ISDN), synchronous or asynchronous digital subscriber line (DSL) units, Fire Wire® interfaces, USB® interfaces, and the like. Communications subsystem 88 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 86 may be detachable components coupled to the computer system 70 via a computer network, a Fire Wire® bus, or the like, and/or may be physically integrated onto a motherboard of the computer system 70. Communications subsystem 86 also may be implemented in whole or in part by software.

In some embodiments, communications subsystem 86 may also receive input communication in the form of structured and/or unstructured data feeds, event streams, event updates, and the like, on behalf of one or more users who may use or access computer system 70. For example, communications subsystem 86 may be configured to receive data feeds in real-time from users of social networks and/or other communication services, web feeds such as Rich Site Summary (RSS) feeds, and/or real-time updates from one or more third party information sources (e.g., external data source 313). Additionally, communications subsystem 86 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 86 may output such structured and/or unstructured data feeds, event streams, event updates, and the like to one or more data stores 14 that may be in communication with one or more streaming data source computers coupled to computer system 70.

Due to the ever-changing nature of computers and networks, the description of computer system 70 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 5:
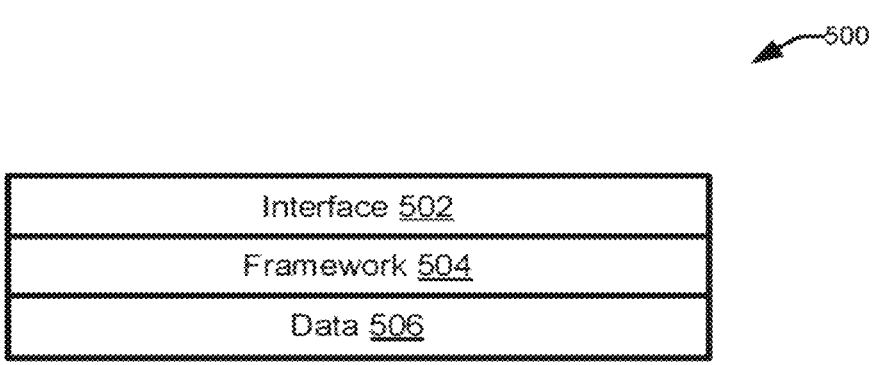
FIG. 5 is a schematic illustration of the digital stack behind a user interface.

With reference now to FIG. 5, a schematic illustration of the digital stack 500 behind a user interface is shown. As seen, the interface 502 is at the top level, and is generated by the framework 504, which framework 504 generates the user interface from data 506. In some embodiments, the framework 504 is a high-level structure within which the interface 502 is generated. The framework 504 can, based on attributes of the user requesting information and based on attributes of the user(s) whose information will be displayed in the user interface, retrieve data from the database server 14 and generate the user interface.

Figure 6:
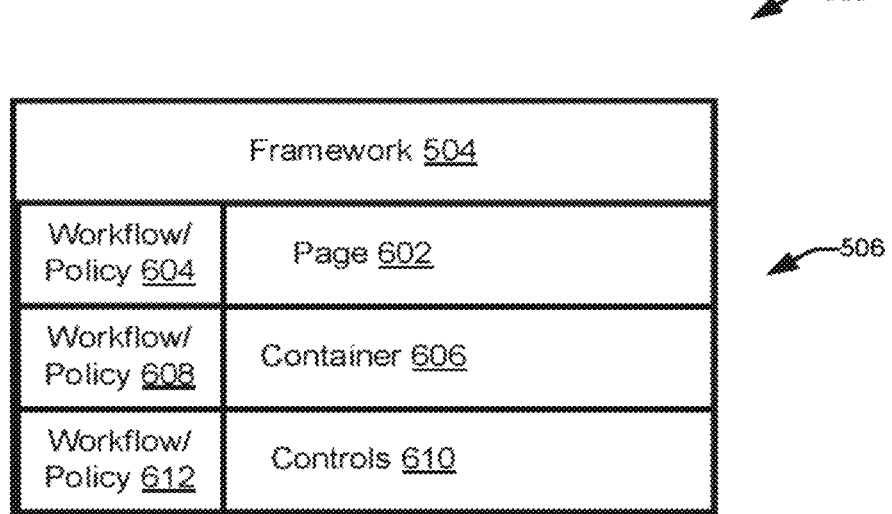
FIG. 6 is a schematic illustration of the digital stack utilized in generating the user interface.

With reference now to FIG. 6, a schematic illustration of the digital stack utilized in generating the user interface 502 is shown. In some embodiments, features 602-612 can be some or all of the data 506 represented in FIG. 5. As seen in FIG. 6, each layer of the data 506 can include a data portion and a workflow/policy portion.

The data portion, identified with page 602, container 606, and controls 610 can include data relevant to their associated level. For example, the page 602 can include data relevant to the page 602, or in other words, that can be utilized to generate displayed content in the user interface. In contrast to this data, the workflow/policy portion includes a workflow and/or policy, which can be executed to manipulate the data at the associated level and/or retrieved data from a lower level in the digital stack.

Thus, execution of the workflow and/or policy 604 at the page level can manipulate page data 602 and/or retrieve data associated with the page 602 that is stored in a lower level of the digital stack, such as, for example, from the container level or from the control level. Similarly, execution of the workflow and/or policy 608 at the container level can manipulate container data 606 and/or retrieve data associated with the container that is stored in a lower level of the digital stack, such as, for example, from the control level. A control can, in some embodiments, be the lowest level in the digital stack, and can be a component that can be included in a page and/or in a container. In some embodiments, the control level can include a workflow and/or policy 612 that can be executed to manipulate one or several controls.

Figure 7:
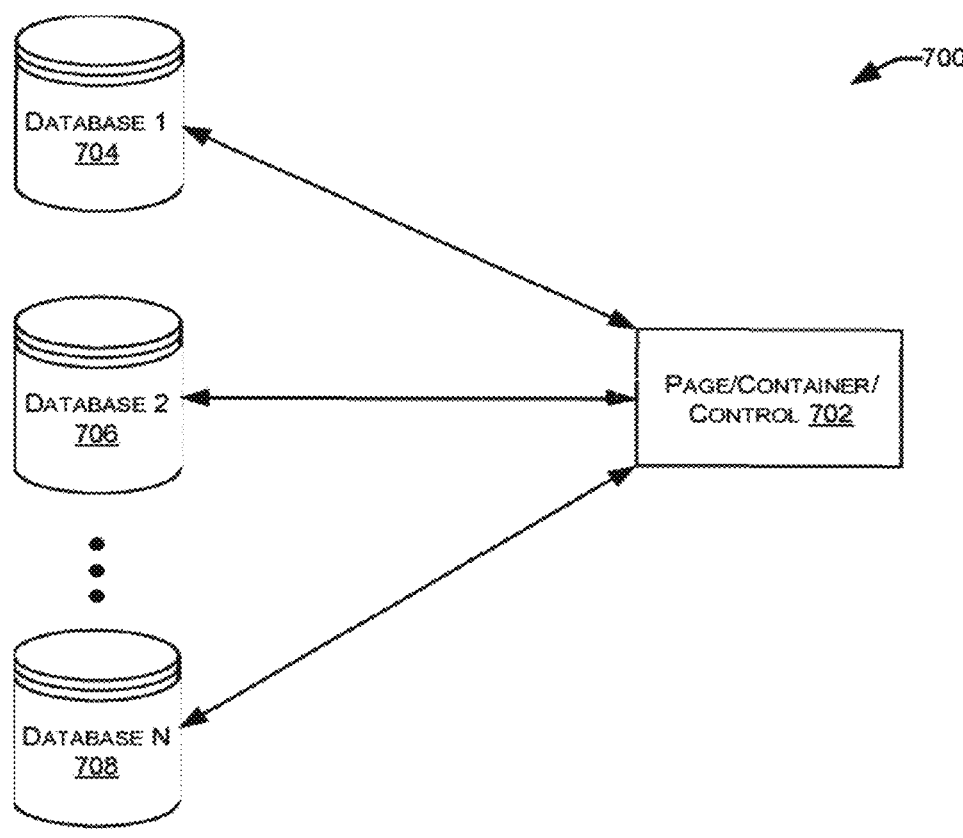
FIG. 7 is a schematic illustration of gathering of information according to a workflow and/or policy of a page, container, and/or control.

With reference now to FIG. 7, a schematic illustration of gathering of information according to a workflow and/or policy of a page, container, and/or control is shown. In some embodiments, and in contrast to current designs, the creation of a page, container, and/or control can be based on information gathered from a plurality of different databases. In some embodiments, this can include, for example, a first database 704, a second database 706, and/or additional databases to an nth database, database N 708. In some embodiments, execution of a workflow and/or policy can result in identification of one or several databases from which to gather data, and can result in the automatic gathering of information from those databases. This information, upon completion of gathering, can be manipulated and/or assembled according to the workflow and/or policy to form the desired page, container, and/or control.

Figure 8:
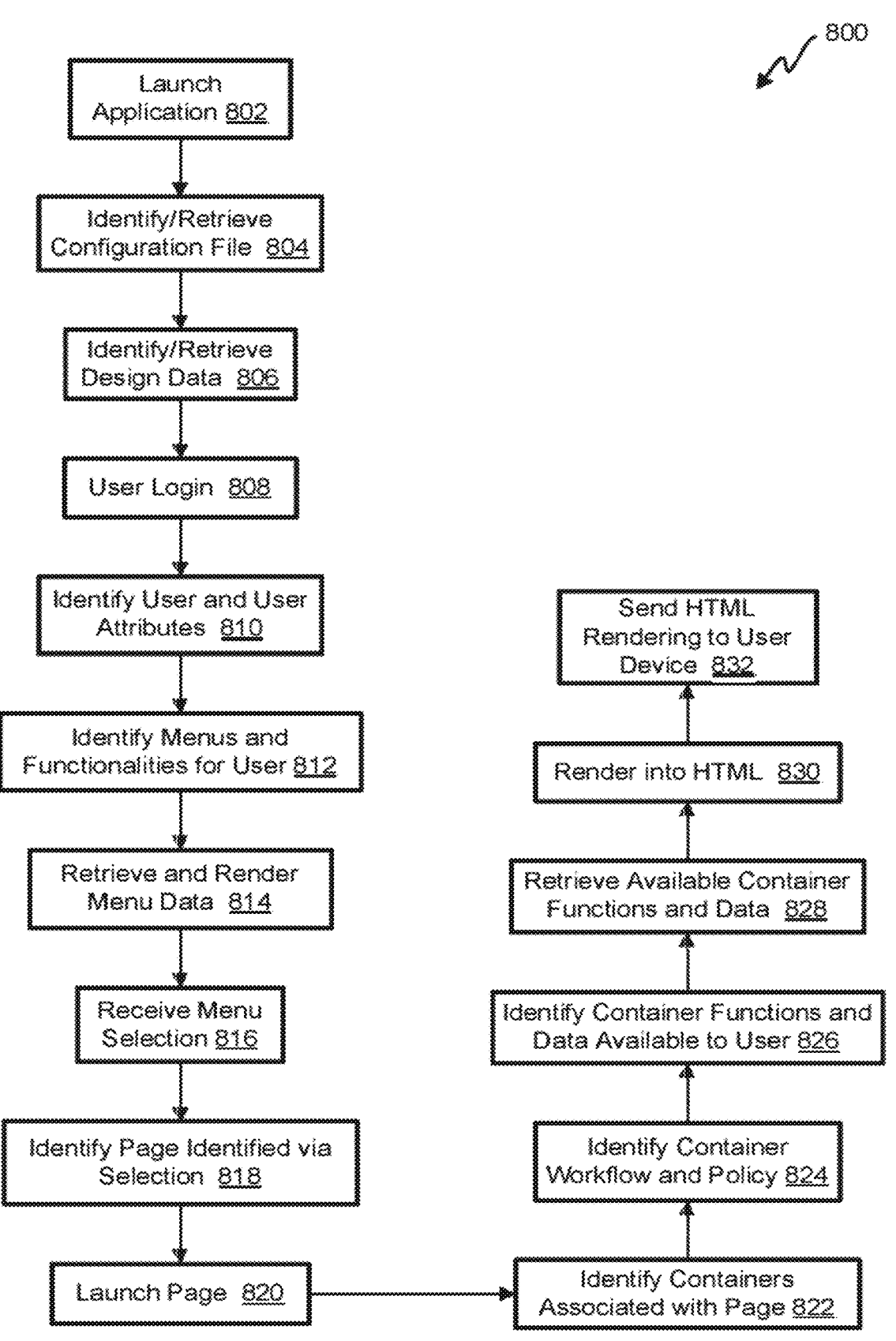
FIG. 8 is a flowchart illustrating one embodiment of a process for automatic generation of the customized user interface.

With reference now to FIG. 8, a flowchart illustrating one embodiment of a process 800 for automatic generation of the customized user interface is shown. The process 800 can be performed by all or portions of the automated generation network 10 can including, for example, server 101. The process 800 begins at block 802 wherein the server 101 is started and an application is launched. The application can identify and retrieve a configuration file as indicated in block 804. In some embodiments, the configuration file can be identified and retrieved from one of the servers, and specifically from the content server 12.

The configuration file can be executed, which can result in the identification retrieval of design data as indicated in block 806. The design data can include all of the data used in the generation of the one or several user interfaces. The retrieval of the design data can include the retrieving of the design data from a data repository and storing that data in the content server 12.

At block 808 a user logs in. In some embodiments, this can include the receipt of user login information by, for example, the server 101. This user login information can include a username and password. In response to receipt of this login information, the login information can be evaluated, and if the login information identifies a valid user, then the user can be logged into the system.

At block 810, the user who has login is identified and the attributes of the user are identified. In some embodiments, this can include identifying a user profile associated with the user. This user profile can be stored in one of the servers, and specifically in the database server 14 or in the user data server 20. These attributes can include, for example, any of the attributes discussed above with respect to a medical service provider, a patient, or any other user.

After the user has been identified, menus and functionalities are identified for the user. In some embodiments, for example, the user profile can include information identifying menus and or functionalities available to the identified user. In some embodiments, based on information contained in the user profile, one or several menus and/or functionalities can be identified as available for the user. After the menus and functionalities have been identified for the user, menu data for these menus and functionalities can be retrieved and/or rendered as indicated in block 814. In some embodiments, the menu data can be retrieved from one of the servers, and specifically from the database server 14 or the content server 12 by the server 101. The menu data can be rendered by the server, which rendering can include converting the menu data into HTML. In some embodiments, the rendered menu data can be sent from the server 101 to one or more of the devices 131, which recipient devices can utilize the rendered menu data in custom generation of the user interface.

At block 816 selection is received by the server 101 from the user via the user interface of the device 131. In some embodiments, this selection can be a menu selection, a control selection, or the like. In some embodiments, a selection of a control can, for example, lead to one or several additional views, menus, or the like. In some embodiments, such as with a drop-down menu, a menu selection can comprise selection of an item from a drop-down menu. At block 818, the server 101 identifies a page identified via the menu selection. In some embodiments, this can include identifying a page linked to the received menu selection. At block 820, the server 101 launches page identified is associated with the menu selection. In some embodiments, the launching of the page can include identifying data associated with the page, retrieving that data, and rendering the retrieved data. In some embodiments, the data associated with the page can be retrieved from one of the servers, and specifically from the database server 14 and/or the content server 12. In some embodiments, data associated with page can be identified, retrieved, and/or rendered the execution of one or several workflows and/or policies of the launched page.

In some embodiments, the launching of the page can further include identifying of containers associated with the page as indicated in block 822. In some embodiments, the containers associated with the page can be identified by the server 101 through execution of one or several workflows and/or policies of the launched page. One or several workflows or policies of the identified containers can be identified and/or retrieved. In some embodiments, these workflows and/or policies can be identified within one of the servers, and specifically within the database server 14 and/or the content server 12.

Upon being identified, the one or several workflows and/or policies can be retrieved from where they are stored and can be executed by the server 101 to identify one or several container functions and container data available to the user as indicated in block 826. As indicated in block 828, the available container functions and/or container data can be retrieved. In some embodiments, the container functions and/or container data can be identified as stored within one of the servers, and specifically within the content server 12 and/or within the database server 14, and in some embodiments, the container functions and/or container data can be retrieved from their place of storage.

After the container functions and/or data have been retrieved, the process 800 proceeds to block 830 wherein all of the retrieved controls and/or data are rendered. In some embodiments, this can include the rendering of page data, container data, and/or container controls. In some embodiments, the rendering of the retrieved data and/or controls can include the conversion of the retrieved data and/or controls into HTML by the server 101. The HTML rendering can then be sent by the server 101 to the device 131 as indicated in block 832. Upon receipt of the HTML rendering, the device 131 can display the rendered HTML to the user in the form of a webpage, a view, user interface, or the like.

Figure 9:
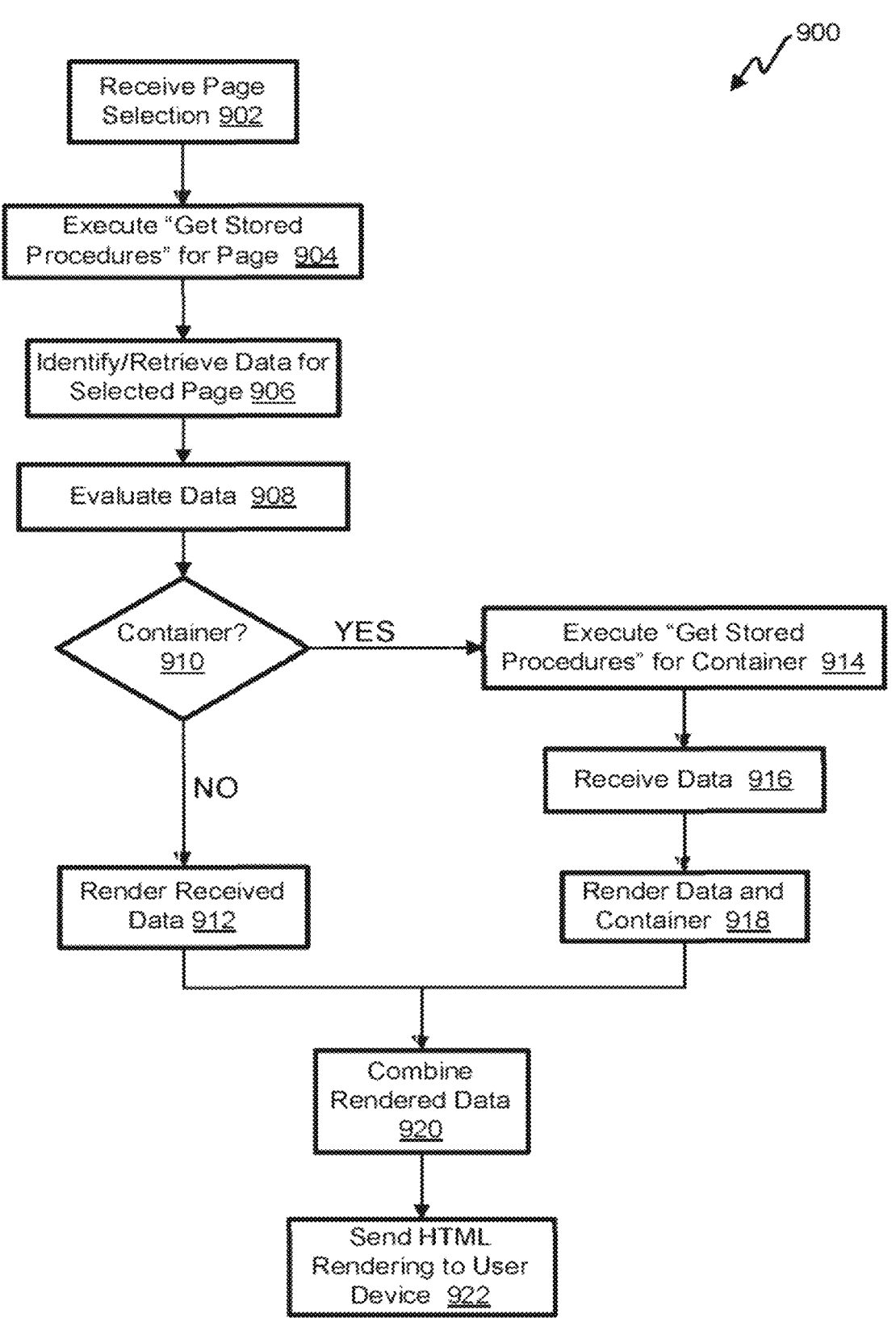
FIG. 9 is a flowchart illustrating one embodiment of a process for generating a page, view, and/or user interface.

With reference now to FIG. 9, a flowchart illustrating one embodiment of a process 900 for generating a page, view, user interface, or the like is shown. The process 900 can be performed as a part of, or in addition to the process 800 of FIG. 8. The process 900 can be performed by the server 101. The process 900 begins at block 902 wherein a page selection is received. In some embodiments, the page selection is received by the server 101 from the device 131. As discussed with respect FIG. 8, page selection can be received via user interaction with the menu of view, a page, user interface, or the like.

At block 904, "Get Stored Procedures" for the selected page identified and executed. In some embodiments, the "get stored procedures" can be all or part of the workflow/policy of the selected page. The "get stored procedures" can be identified and executed by, for example, the server 101. As part of executing the "get stored procedures", data for the selected page is identified and/or retrieved as indicated in block 906.

The data for the selected page can be identified and/or retrieved by, for example, the server 101 from one of the servers such as, for example, the content server 12 and/or the database server 14. In some embodiments, for example, the data for the selected page can be identified and/or retrieved by one of the devices 131 and/or via an API. In some embodiments, some of the identified and/or retrieved data can be identified in and/or retrieved from one or several user profiles in the database server 14. In some embodiments in which the display of information relating to one or several patients is requested, the user profile(s) in which the data can be identified and/or from which the data can be retrieved can be, for example, one or several user profiles for the one or several patients for which the display of information was requested. In some embodiments, the user profile in which the data is identified and/or from which the data is retrieved can be the user profile of the user logged in in block 808, can be the user profile from the user requesting the display of information relating to one or several patients, and/or can be the user profile for a user to which the information relating to one or several patients will be displayed.

At block 908 the retrieved data is evaluated. In some embodiments, this can include evaluating the retrieved data to determine if one or several containers are identified for inclusion in the page. This evaluation can be performed by the server 101. A decision step 910, it is determined if the data indicates that one or several containers are associated with the page. This determination can be made by the server 101.

It is determined that there are no containers associated with the page, then the process 900 proceeds to block 912 wherein the received data is rendered. In some embodiments, the received data can be rendered by the server 101. In some embodiments, the rendering can include converting the data into HTML.

Returning again to decision state 910, if it is determined that there is one or several containers associate with the page, than the process 900 proceeds to block 914 wherein each of the containers associated with the page are selected, and for each of the containers, "Get Stored Procedures" are identified and executed. In some embodiments, the "get stored procedures" can be all or part of the workflow/policy of the selected container. The "get stored procedures" can be identified and executed by, for example, the server 101. As part of executing the "get stored procedures", data for the selected container is identified and/or retrieved as indicated in block 916.

After data for the container is received, the process 900 proceeds to block 918 wherein the data for the container is rendered. In some embodiments, the data for the container can be rendered by the server 101. In some embodiments, the rendering can include converting the data into HTML.

At block 920 rendered data is combined. In some embodiments, this can include combining rendered page data with rendered data for one or several containers. In some embodiments, the rendered data can be combined according to all or portions of the workflow and/or policy 604 of the page 602. After the rendered it is combined, the HTML of the combined vendor data is sent to the device 131. The device 131, upon receiving the rendered HTML can generate and/or display a user interface according to the HTML, and thus corresponding to the combined rendered data.

Figure 10:
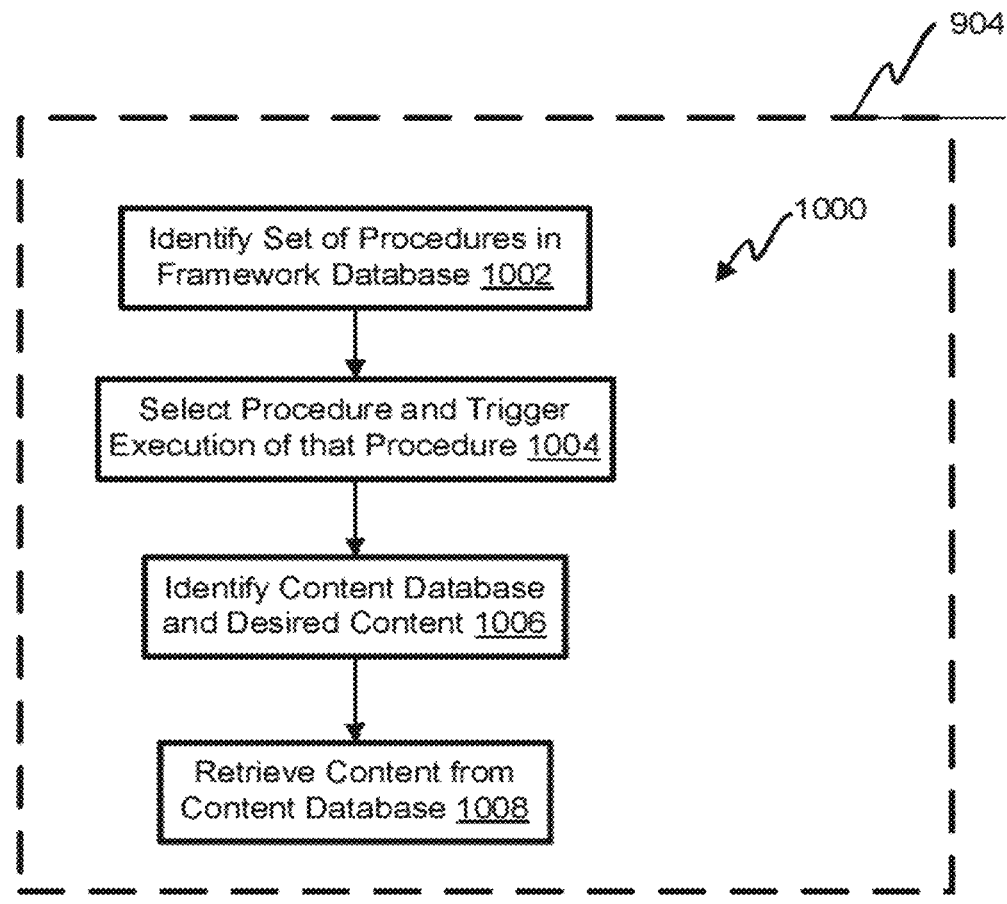
FIG. 10 is a flowchart bowstring one embodiment of a process for executing "get stored procedures."

With reference now to FIG. 10, a flowchart bowstring one embodiment of a process 1000 for executing "get stored procedures." In some embodiments, the process 1000 to be performed as a part of, or in the place of the step of block 904 of process 900. The process 1000 Be performed by the server 101.

The process 1000 begins at block 1002 wherein the server 101 identifies a set of procedures for the selected page. In some embodiments, these procedures can be identified in one of the servers, and specifically in the database server 14 and/or the content server. In some embodiments, these procedures can be stored within a database in one or several of the servers, which database can be, for example, a framework database.

After a set of procedures has been identified, which procedures are relevant to the selected page, one of the procedures the selected and execution of that procedure is triggered as indicated in block 1004. In some embodiments, this procedure can be selected and execution of that procedure can be triggered by the server 101. Through execution of that procedure, one or several databases are identified, which databases contain content associated with that page. In some embodiments, these one or several databases can include, for example, a content database which can be stored in, for example, the content server 12 and/or the database server. In some embodiments, the desired content can comprise medical content which can include, for example, one or several medical records, patient information, procedure information, or the like.

After the content has been identified, the identified content is retrieved as indicated in block 1008. In some embodiments, this can include the server 101 retrieving content from one or more of the servers, and specifically from one or more databases in the one or more servers. In some embodiments, the one or more servers can include, for example, the content server 12 and/or the database server 14. In some embodiments, steps 1004 through 1008 can be repeated until they have been performed for each of the procedures in the identified set of procedures.

Figure 11:
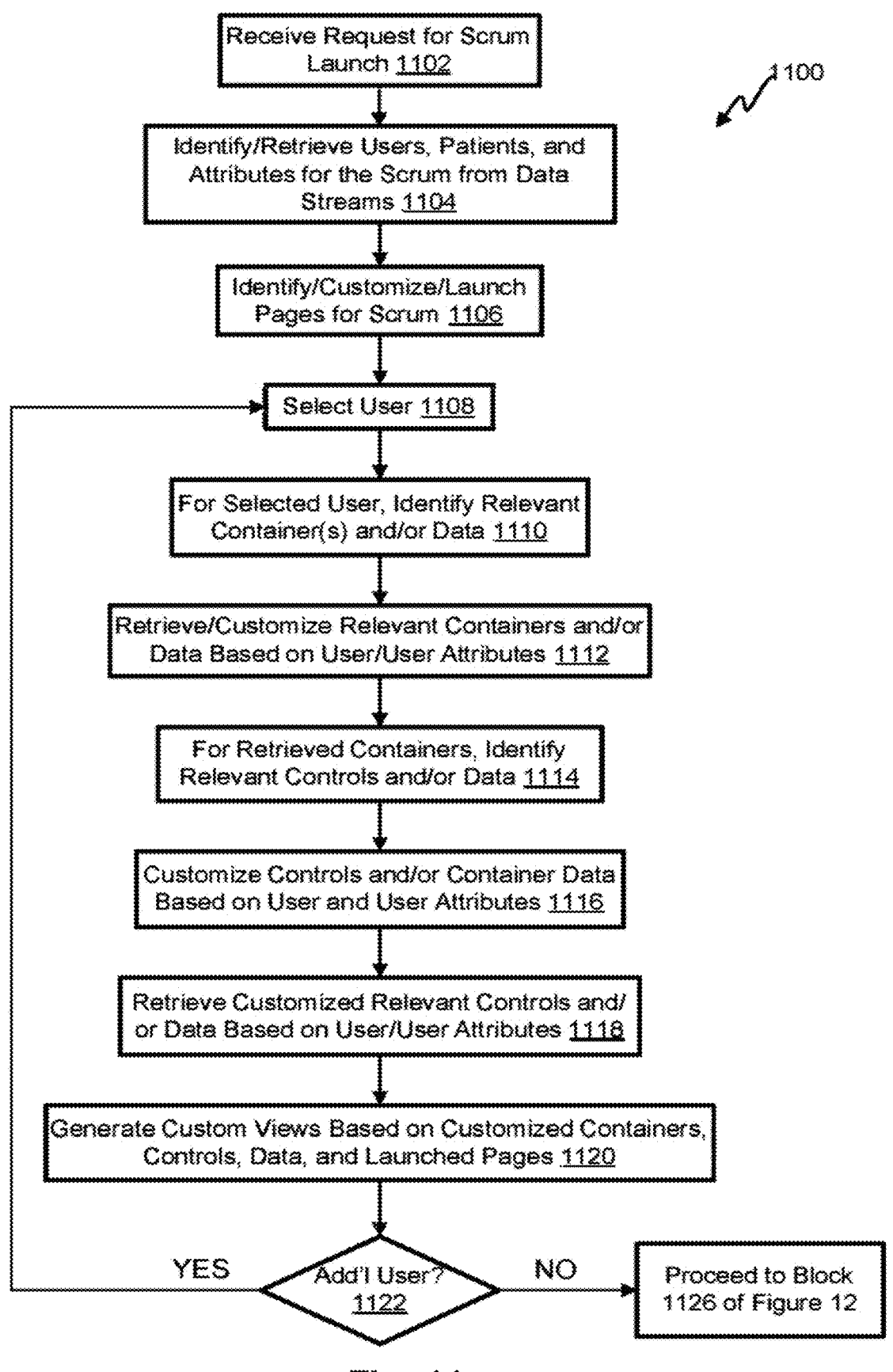
FIG. 11 is a flowchart illustrating a first portion of one embodiment of a process for generating a scrum interface and a plurality of unique views within the scrum interface.

With reference now to FIG. 11, a flowchart illustrating one embodiment of a process 1100 for generating a scrum interface and a plurality of unique views within the scrum interface is shown. In some embodiments, a scrum interface comprises an interface having a plurality of unique views displaying content relevant to a common subject. In some embodiments, this common subject can comprise a patient, a procedure, a set of patients, or the like. In some embodiments, although each of a plurality of viewing users view information in a scrum interface relating to a common subject, some or all of the viewing users can be displayed a custom view. In some embodiments, the custom view can customize the information presented to one or several of the viewing users, which customization can be based on, for example, one or several attributes of the one or several viewing users receiving the custom view. These one or several attributes of the one or several viewing users receiving the custom view can include, for example, the identity of the viewing user, attributes of the viewing user, the role of the viewing user, the location of viewing user, a time, or the like.

The process 1100 begins at block 1102 wherein a request for launch of the scrum interface is received. In some embodiments, this request for launch the scrum interface can be received by the server 101 from one or several devices 131 such as, for example, from one or several user devices 140 and/or one or several provider devices 136. At block 1104 viewing users for interacting with the scrum interface, the subjects of the scrum, and attributes relevant to the generation of the scrum interface and/or the custom views are identified and/or associated information is retrieved. In some embodiments, the viewing users, the subjects, which subjects can be one or several patients, and the attributes can be identified from one or several data streams, or in other words from one or several databases stored on the server such as, for example, the content server 12, the database server 14 and/or the user data server 20. In some embodiments, these viewing users, subjects, and attributes can be identified by the server 101.

At block 1106 pages for the scrum interface are identified, selected, customized, and/or launched. In some embodiments, these pages can be identified, selected, customized, and/or launched based on information identified and retrieved in block 1104. In some embodiments, for example, one of the servers such as, for example, the content server 12 can comprise a plurality of templates for pages. In some embodiments, one or several templates for pages can be selected for use in generating the scrum interface based on the information identified and retrieved in block 1104, which information can include, for example, the identity of one or several viewing users and/or of one or several subjects, attributes of one or several viewing users and/or of one or several subjects, location, date, or the like. After one or several templates for pages have been identified, the templates can be used to generate customized pages, which customization can be based on the information identified and retrieved in block 1104. Once these pages have been customized, they can be launched.

At block 1108 one of the viewing users is selected. At block 1110, for the selected user, and based on the launched page for that selected user, relevant containers and/or data identified. In some embodiments, this can occur as outlined, for example in processes 800 and 900, or with reference to FIG. 6, via selection and/or execution of one or several workflows and/or policy 604 associated with the page of the selected user. In some embodiments, the relevant containers and/or data can be identified by the server 101.

At block 1112, relevant containers and/or data are retrieved and customized. In some embodiments, these containers and/or data can be customized based on characteristics of the viewing user for which the page and/or view is being prepared, characteristics of the one or several subjects, or the like. In some embodiments, for example, a viewing user having a lower/different qualification level may receive a customization decreasing the complexity of narratives shown in the page and/or in one or several containers, whereas a viewing user with a higher/different qualification level may receive a customization increasing the complexity of narratives. This qualification level can include, for example, an education level.

At block 1114, relevant controls and/or data are identified for the retrieved containers. In some embodiments, this can occur as outlined, for example in processes 800 and 900, or with reference to FIG. 6, via selection and/or execution of one or several workflows and/or policy 608 associated with the retrieved container. In some embodiments, the relevant controls and/or data can be identified by the server 101.

At block 1116 the controls and/or container data retrieved in block 1114 are customized. In some embodiments, these controls and/or container data are customized based on, for example, the identity of the viewing user and/or of the one or several subject, one or several attributes of the viewing user and/or of the one or several subjects, location, time, or the like. In some embodiments, the customization of the controls and/or the container data can include, for example, modification of container data to be displayed to the viewing user, modification the format of the container data to be displayed to the viewing user, modification of functionality of one or several controls, modification of the inclusion of one or several controls, or the like. In some embodiments, the customization can be performed by the server 101.

At block 1118, the customized relevant controls and/or container data retrieved. In some embodiments, these can be retrieved by the server 101. At block 1120 custom user views are generated based on the customized containers, controls, data, and/or launched pages. In some embodiments, a custom view can be generated for each of the viewing users, and in some embodiments multiple viewing users may share a common custom view. In some embodiments, generating a custom view can include combining the customized containers, controls, data, and launched pages into the custom view. In some embodiments, generating a custom view can include auto-generating text. In some embodiments, this text can be auto-generated based on some or all of the data used in generating the custom view. In some embodiments, this text can be custom auto-generated to match and/or reflect one or several attributes of the viewing user. The text can be auto-generated via a machine learning process, such as via, for example, natural language generation. The custom views can be generated by the server 101.

A decision step 1122, it is determined if there is an additional viewing user. If it is determined that there is an additional viewing user, then the process 1100 returns to block 1108 and proceeds as outlined above. If it is determined there is not an additional viewing user, then the process 1100 proceeds to block 1126 of FIG. 12.

With reference now to FIG. 12, a flowchart showing a second portion of the process 1100 is shown. The process of FIG. 12 continues from block 1124 of FIG. 11 at block 1126 wherein the custom views are rendered. In some embodiments, the rendering of the custom views can include the rendering of the custom views in HTML. In some embodiments, the rendering of the custom views can be performed by the server 101.

At block 1128, the rendered views can be communicated to one or several devices 131. In some embodiments, the server 101 can send these rendered views via, for example, the communication network 22. In some embodiments, each rendered view can be delivered to the one or several viewing users for which that rendered view was created. In some embodiments, the rendered views can be sent to a plurality of devices 131 to affect simultaneous viewing of the customized views by the plurality of viewing users. In some embodiments, the rendered views can be sent to a plurality of devices 131 to control and/or direct simultaneous viewing of the customized views by the plurality of viewing devices. The devices 131, upon receiving the rendered views, can generate the user interface based on these rendered views a display that user interface to the viewing user.

At block 1130, one or several inputs for subject attributes of one or several of the subjects for which the custom view was generated are received. In some embodiments, these inputs can be received from one or several of the viewing users, and these inputs can comprise encoded inputs. In some embodiments, these inputs can be received from each of the viewing users for each of a plurality of categories of each of the subject. In some embodiments, a viewing users encoded inputs can represent that viewing users characterization of different aspects of the subject's health. These can include, for example, physical, mental, social, or the like.

At block 1132, based on the inputs and/or previously stored data, an aggregate score is generated for each of the plurality of categories and for each of the subjects. In some embodiments, this can include combining the inputs received from each of the viewing users. The aggregate score can be generated by the server 101. These inputs can include, for example, one or several objective inputs and/or objective pieces of data and/or one or several subjective inputs and/or subjective pieces of data. In some embodiments, these inputs and/or pieces of data can be identified as objective or subjective, and/in some embodiments, can be weighted. This weighting can, in some embodiments, be performed according to a machine learning algorithm, which machine learning algorithm can comprise, for example, a machine learning model based on unsupervised learning such as, for example, clustering. In such embodiments, the aggregate score can be generated based on the weighted inputs and/or pieces of data.

At block 1134, the aggregate score for each of the subjects is displayed to each of the viewing users in their customized view. This aggregate score can, in some embodiments, be multi-dimensional. In some embodiments, the display of the aggregate score can include modifying the customized view to display the aggregate score. In some embodiments, the aggregate score for a subject can be compared to one or several threshold values. If the aggregate score, or component of the aggregate score falls below a threshold value, than the subject can be identified for receipt of a service and/or intervention. In some embodiments, and as indicated in block 1136, this can include scheduling a subject for services based on the aggregated score. In some embodiments, based on the degree to which the aggregate score and/or the component the aggregate scores below threshold, the subject may be prioritized for more immediate services. The scheduling of the subject for services based on the in score can be performed by the server 101.

Figure 13:
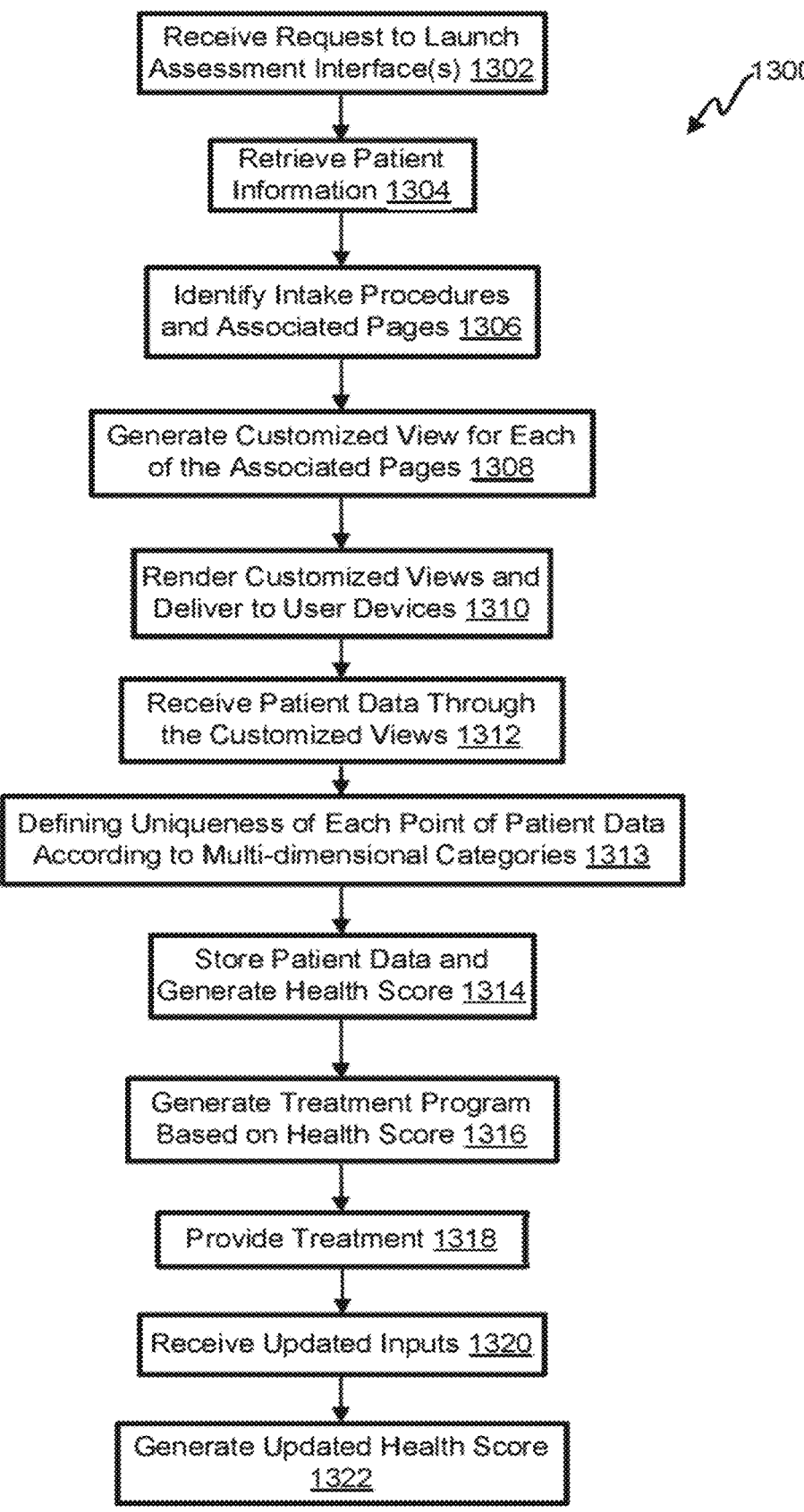
FIG. 13 is a flowchart illustrating one embodiment of a process for generating an assessment/evaluation interface and utilizing the assessment/evaluation interface to generate a characterizing score.

With reference now to FIG. 13, a flowchart illustrating one embodiment of a process 1300 for generating an assessment/evaluation interface and utilizing the assessment/ evaluation interface to generate a characterizing score is shown. In some embodiments, an input interface can comprise an assessment interface. In some embodiments, an induction interface can be used for an initial assessment/ evaluation, whereas the assessment/evaluation interface can include the initial assessment/evaluation and/or any subsequent assessment/evaluation. The process 1300 can be performed in connection with some or all of the steps of process is 800 and/or 900. The process 1300 can be performed by the server 101. The process 1300 begins at block 1302 wherein a request to launch the assessment/evaluation interface is received. In some embodiments, the request to launch the assessment/evaluation interface can be received by the server 101 from one or several of the devices 131. In some embodiments, the request to launch the assessment/evaluation interface can identify the viewing user that will utilize the assessment/evaluation interface, a location at which the assessment/evaluation will be performed, and/or the subject whose information will be gathered via the assessment/ evaluation interface.

At block 1304, subject information is retrieved. In some embodiments, the subject information can be retrieved for the subject identified with the request to launch the assessment/evaluation interface. This can include, for example, identifying the subject, identifying information relevant to the subject in one of the servers such as, for example, the database server 14 and/or the user server 20, and retrieving that information from the server. In some embodiments, this can include identifying the user profile for the subject and retrieving that user profile. In some embodiments, the server 101 can request information relating to the subject in the form of one or several queries, in response to which the information relating to the subject can be returned to the server 101.

At block 1306 one or several assessment/evaluation procedures are identified. In some embodiments, the assessment/evaluation procedures can include intake procedures. In some embodiments, these assessment/evaluation procedures can be identified based on the viewing user and/or one or several attributes of the viewing user, the subject, and/or the location at which the assessment/evaluation will be performed. In some embodiments, the assessment/evaluation procedures can be identified via application of one or several rules to information relating to the viewing user, the subject, and/or the location which assessment/evaluation will be performed. In some embodiments, some or all of the assessment/evaluation procedures can be linked to one or several associated pages. Thus, via identification of the assessment/evaluation procedures, one or several associated pages can be identified. The assessment/evaluation procedures and/or associated pages can be identified by the server 101.

At block 1308, a customized view is generated for each of the associated pages identified in block 1306. In some embodiments, the generation of a customized view can include the identification of information relevant to the customization, which information can be, for example, information relating to the viewing user, information relating to the subject for which the assessment/evaluation interface is been generated, the time at which the assessment/evaluation is being performed, and/or information related to the location at which the assessment/evaluation is being performed. In some embodiments, this information used in the generation of the customer's use can be retrieved based on information received in the lots request. This information can be retrieved from some the servers such as, for example, the content server 12, the database server 14, and/or the user data server 20.

Once this information has been received, and with the identified associated pages, custom views can be generated. The customers use can be generated as previously outlined by, for example, executing the workflows and policies of each of the pages, retrieving data for each of the pages, identifying containers associated with each of the pages, executing the workflows and social policies of each of the containers, retrieving data associated with each of the containers, identify controls associated with the pages and/or with containers, and/or executing workflows and/or policies for each of the controllers. Through this, customization can be incorporated into each level of the digital stack such that, for example, controls can be customized, containers can be customized, and pages can be customized. All of these customized layers in the digital stack can be combined to create the customized view. This customization can be performed by the server 101.

At block 1310, the customized views can be rendered. In some embodiments, this can include rendering the customized views into HTML. This rendering can be performed by, for example, the server 101. The rendered customized views can be delivered to devices 131 being used by the viewing user. The recipient device 131 can display one or several of the customized views to the viewing user. As services are provided, the viewing user can input information into the device 131, thereby inputting information into one or several customized views.

At block 1312 data relating to the subject is received through the customized views on the device 131 and is provided to the server 101. At block 1313, the received data is evaluated, and data points within the received data are identified. These data points can be, for example, discrete portions of data relating to a single attribute, such as, for example, the subject's weight, height, blood-pressure, or the like. Unique points of data can be identified based on information relating to entry of the input data. For example, in some embodiments, unique points of data may be separately input and/or may be delineated during input. After the discrete points of data are identified, uniqueness is defined for each point of input data. In some embodiments, this uniqueness can be defined according to multi-dimensional categories. For example, in some embodiments, multiple categories can be applied to each distinct point of data, and a score can be generated for each unique point of data for each of the multiple categories. In some embodiments, these scores can be applied based on metadata associated with each of the distinct data points.

At block 1314 the received data is stored by the server 101, and specifically, the received data can be stored by the server 101 in another server such as, for example, the database server 14 and/or the user data server 20. In some embodiments, this data can be stored in a user profile associated with the subject.

In addition to storing the subject data, a characterization score can be generated for the subject. This characterization score can comprise a multidimensional vector. The characterization score, which can be a health score, also referred to herein as a global health score can be stored in the subject's user profile.

At block 1316 a treatment program is generated based on the health score. In some embodiments, this can include ingesting the health score and/or information relating to the subject into machine learning model configured to identify one or several treatments or services to provide based on the help score and/or the information relating to the subject. In some embodiments, this machine learning model can be configured to identify one or several treatments or services, and to provide an indication of the expected efficacy of those treatments or services.

At block 1318 these treatments are provided to the subject, and at block 1320 updated inputs are received to the customized views similar to the receipt of subject data in block 1312. In some embodiments, this information can be received via viewing user inputs into the customized views, and in some embodiments, this information can be received via a direct connection between, for example, the server 101 and one or several devices used in providing the services and/or treatments. In some embodiments, and as part of block 1320, based on these updated inputs, the subject user profile can be updated and an updated characterization score can be generated as indicated in block 1322. This updated characterization score can reflect the change in the subject's user profile caused by the provided treatments and the received updated inputs. This updated characterization score can be generated by the server 101.

Figure 14:
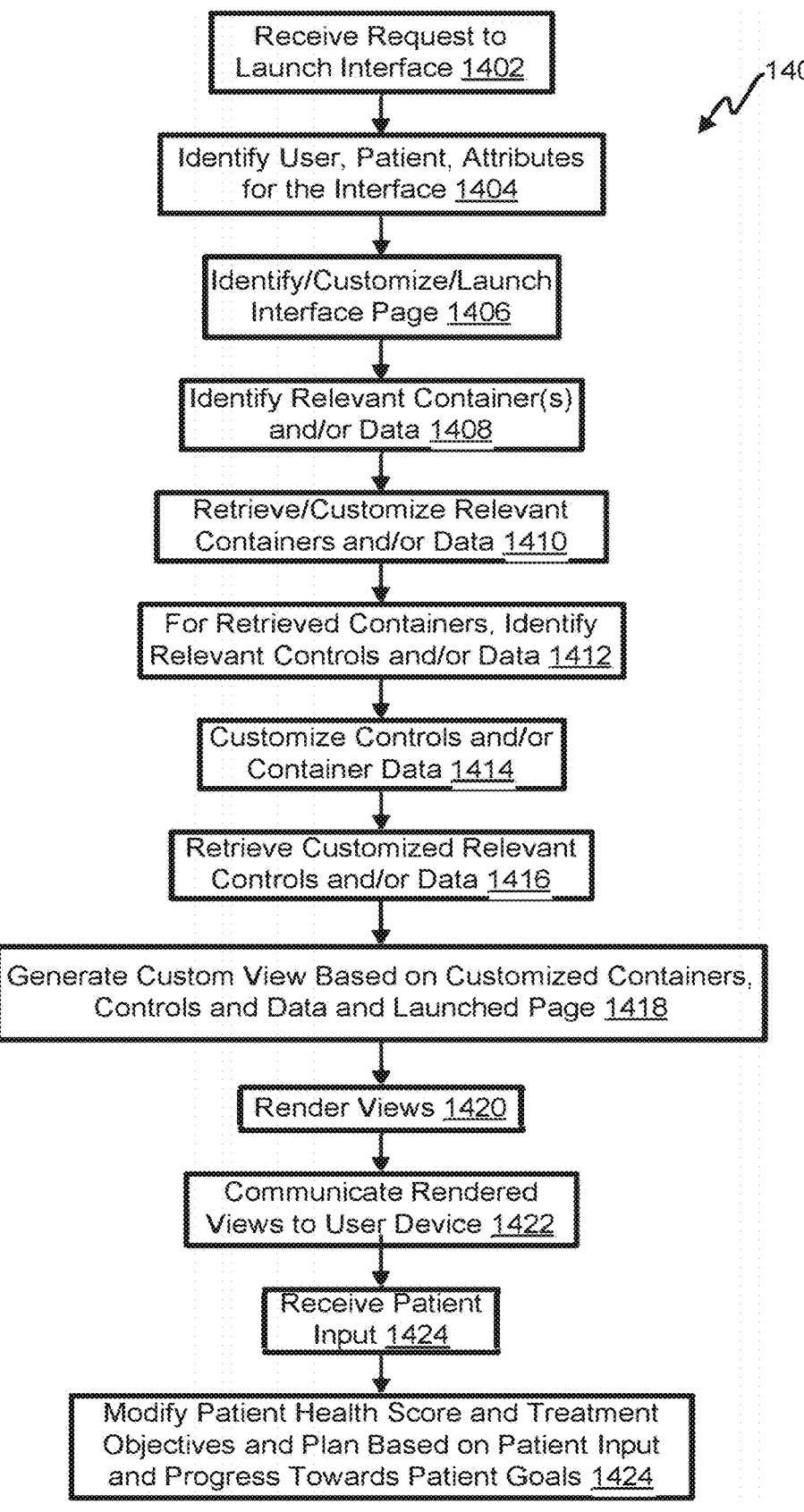
FIG. 14 is a flowchart illustrating one embodiment of a process for generating a subject across time and space interface.

With reference to the FIG. 14, a flowchart illustrating one embodiment of a process 1400 for generating a subject across time and space interface is shown. The process 1400 can be performed in connection with some or all of the steps of process is 800 and/or 900. The process 1400 can be performed by the server 101. The process 1400 begins at block 1402 wherein a request to launch the subject across time and space interface is received. In some embodiments, the request to launch the subject across time and space interface can be received by the server 101 from one or several of the devices 131. In some embodiments, the request to launch the subject across time and space interface can identify the viewing user that will utilize the subject across time and space interface, a location at that viewing user, and/or the subject whose information will be displayed via the subject across time and space interface. In some embodiments, the viewing user can be the subject, in other words, in some embodiments the user requesting generation of the subject across time and space interface can be the subject.

At block 1404 the viewing user, the subject, and relevant attributes for generation of the subject across time and space interface are identified. In some embodiments, the viewing user, the subjects, and the attributes can be identified from one or several data streams, or in other words from one or several databases stored on the server such as, for example, the content server 12, the database server 14 and/or the user data server 20. In some embodiments, the viewing user, subject, and attributes can be identified by the server 101.

At block 1406 pages for the subject across time and space interface are identified, selected, customized, and/or launched. In some embodiments, these pages can be identified, selected, customized, and/or launched based on information identified and retrieved in block 1404. In some embodiments, for example, one of the servers such as, for example, the content server 12 can comprise a plurality of templates for pages. In some embodiments, one or several templates for pages can be selected for use in generating the subject across time and space interface based on the information identified and retrieved in block 1404, which information can include, for example, the identity of the viewing user and/or of the subject, attributes of the viewing user and/or of the subject, location, date, or the like. After one or several templates for pages have been identified, the templates can be used to generate customized pages, which customization can be based on the information identified and retrieved in block 1404. Once these pages have been customized, they can be launched.

At block 1408, based on the launched page(s), relevant containers and/or data identified. In some embodiments, this can occur as outlined, for example in processes 800 and 900, or with reference to FIG. 6, via selection and execution of one or several workflows and/or policy 604 associated with the page of the selected user. In some embodiments, the relevant containers and/or data can be identified by the server 101.

At block 1410, relevant containers and/or data are retrieved and/or customized. In some embodiments, these containers and/or data can be customized based on characteristics of the viewing user for which the page and/or view is being prepared, characteristics of the subject, or the like. In some embodiments, for example, a viewing user having a lower qualification level may receive a customization decreasing the complexity of narratives shown in the page and/or in one or several containers, whereas a viewing user with a higher qualification level may receive a customization increasing the complexity of narratives.

At block 1412, for the retrieved containers, relevant controls and/or data are identified. In some embodiments, this can occur as outlined, for example in processes 800 and 900, or with reference to FIG. 6, via selection and/or execution of one or several workflows and/or policy 608 associated with the retrieved container. In some embodiments, the relevant controls and/or data can be identified by the server 101.

At block 1414 the controls and/or container data retrieved in block 1412 are customized. In some embodiments, these controls and/or container data are customized based on, for example, the identity of the viewing user and/or of the subject, one or several attributes of the viewing user and/or of the subject, location, time, or the like. In some embodiments, the customization of the controls and/or the container data can include, for example, modification of container data to be displayed to the viewing user, modification the format of the container data to be displayed to the viewing user, modification of functionality of one or several controls, modification of the inclusion of one or several controls, or the like. In some embodiments, the customization can be performed by the server 101.

At block 1416, the customized relevant controls and/or container data retrieved. In some embodiments, these can be retrieved by the server 101. At block 1418 the custom user view is generated based on the customized containers, controls, data, and/or launched pages. In some embodiments, generating a custom view can include combining the customized containers, controls, data, and launched pages into the custom view. In some embodiments, generating a custom view can include auto-generating text. In some embodiments, this text can be auto-generated based on some or all of the data used in generating the custom view. In some embodiments, this text can be custom auto-generated to match and/or reflect one or several attributes of the viewing user. The text can be auto-generated via a machine learning process, such as via, for example, natural language generation. The custom views can be generated by the server 101.

At block 1420, the custom views are rendered. In some embodiments, the rendering of the custom views can include the rendering of the custom views in HTML. In some embodiments, the rendering of the custom views can be performed by the server 101.

At block 1422, the rendered views can be communicated to one or several devices 131. In some embodiments, the server 101 can send these rendered views via, for example, the communication network 22. In some embodiments, each rendered view can be delivered to the one or several viewing users for which that rendered view was created. The one or several devices 131, upon receiving the rendered views, can generate the user interface based on these rendered views a display that user interface to the viewing user.

At block 1424, one or several inputs for subject attributes of one or several of the subjects for which the custom view was generated are received. In some embodiments, these inputs can be received from the viewing user, which viewing user can be the subject, and specifically can be a patient. Based on these received inputs, the user profile of the subject can be updated, and an updated characterization score can be generated as indicated in block 1424. This updated characterization score can reflect the change in the subject's user profile caused by the received updated inputs. This updated characterization score can be generated by the server 101.

Figure 15:
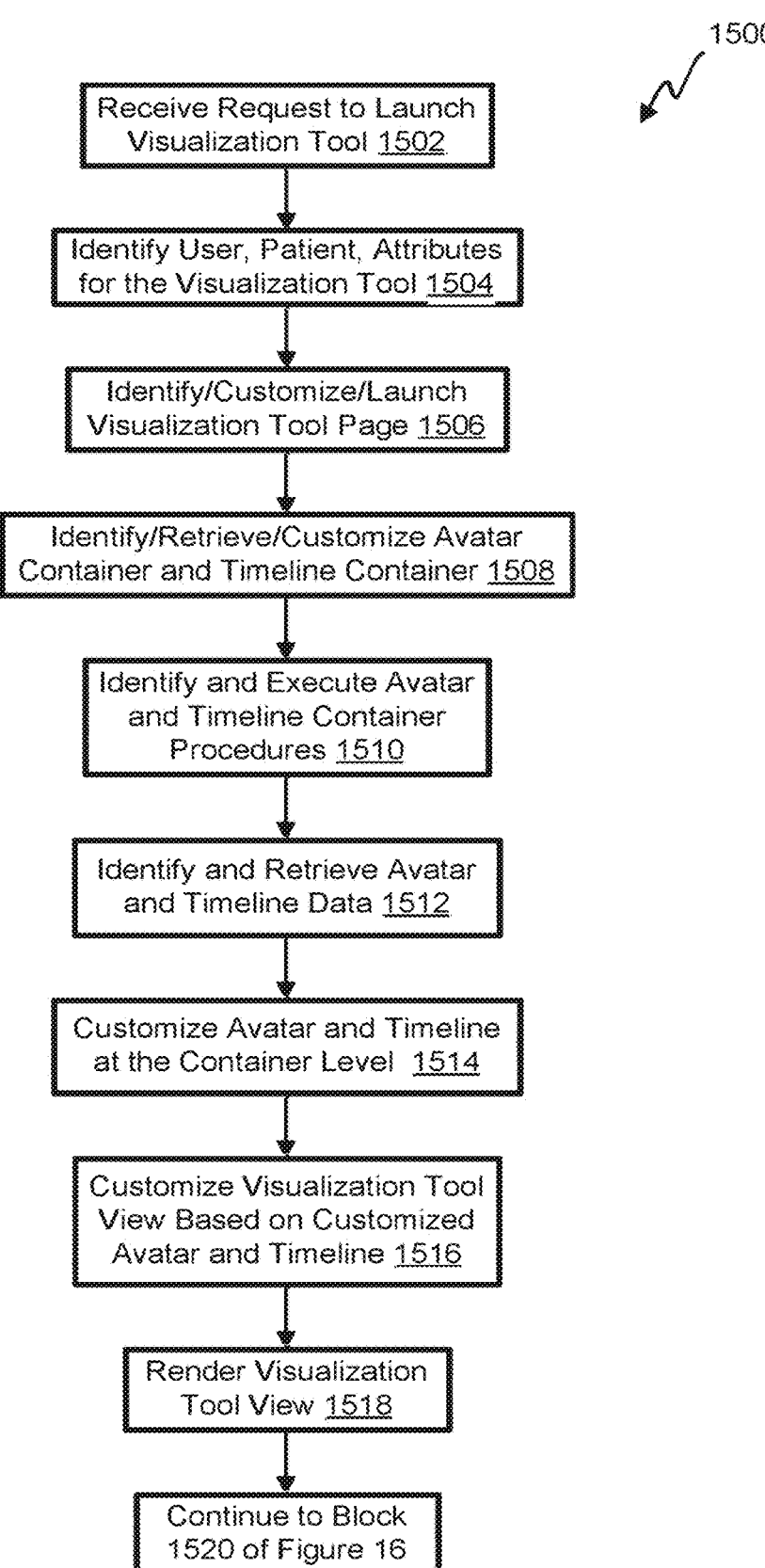
FIG. 15 is a flowchart illustrating a first portion of one embodiment of a process for automated generation of a visualization tool within the customized user interface.

With reference now to FIG. 15, a flowchart illustrating one embodiment of a process 1500 for automated generation of a visualization tool within the customized user interface is shown. The process 1500 can be performed in connection with some or all of the steps of process is 800 and/or 900. The process 1500 can be performed by the server 101.

The process 1500 begins at block 1502 wherein a request to launch the visualization tool is received. In some embodiments, the request to launch the visualization tool can be received by the server 101 from one or several of the devices 131. In some embodiments, the request to launch the visualization tool can identify the viewing user that will utilize the visualization tool, a location at that viewing user, and/or the subject whose information will be displayed via the visualization tool. In some embodiments, the viewing user can be the subject, in other words, in some embodiments the user requesting generation of the visualization tool can be the subject. In some embodiments, the visualization tool can be part of the subject across time and space interface, and thus a request to launch the subject across time and space interface can include a request to launch the visualization tool.

At block 1504 the viewing user, the subject, and relevant attributes for generation of the visualization tool are identified. In some embodiments, the viewing user, the subjects, and the attributes can be identified from one or several data streams, or in other words from one or several databases stored on the server such as, for example, the content server 12, the database server 14 and/or the user data server 20. In some embodiments, the viewing user, subject, and attributes can be identified by the server 101.

At block 1506 pages for the visualization tool are identified, selected, customized, and/or launched. In some embodiments, these pages can be identified, selected, customized, and/or launched based on information identified and retrieved in block 1504. In some embodiments, for example, one of the servers such as, for example, the content server 12 can comprise a plurality of templates for pages. In some embodiments, one or several templates for pages can be selected for use in generating the visualization tool based on the information identified and retrieved in block 1504, which information can include, for example, the identity of the viewing user and/or of the subject, attributes of the viewing user and/or of the subject, location, date, or the like. After one or several templates for pages have been identified, the templates can be used to generate customized pages, which customization can be based on the information identified and retrieved in block 1504. Once these pages have been customized, they can be launched.

At block 1508, based on the launched page(s), relevant containers and/or data identified. In some embodiments, these can include one or several containers for generation of an avatar, and one or several containers for generation of a timeline. In some embodiments, the avatar can be a representation of the subject for which the visualization tool is been generated. In some embodiments, the avatar can be a completely artistic representation of the subject, in some embodiments, the avatar can be a partially artistic representation of the subject, and in some embodiments, the avatar can be a non-artistic representation of the subject.

By way of example, and artistic representation of the subject may have no relation to the subject or to any of the subject's attributes. For example, an artistic avatar may be a cartoon avatar. In contrast, a partially artistic representation of the subject may have some relation to the subject or to any of the subject attributes. In such an embodiment, while the partially artistic avatar may be a cartoon avatar, the cartoon avatar may be proportioned to represent one or several measurements of the subject such as, for example, an inseam, a thigh circumference, a forearm circumference, an upper arm circumference, a chest measurement, a waist measurement, neck measurement, or the like. A non-artistic avatar can be an avatar generated from data collected from the subject, and specifically from image, video, and/or scan data such as data generated from a body scan, an MRI, and x-ray, a DEXA scan, or the like.

In some embodiments, the avatar can display information indicating a location on the subject's body of one or several conditions, ailments, symptoms, injuries, pains, sensations, or the like. For example, if the subject were to injure his left elbow, the avatar can display an injury to that left elbow in the form of a graphical representation. Clicking on the graphical representation of the injury could result in the display of more information relating to that injury, treatment of the injury, or the like.

The timeline can be a representation of a history of the subject, and specifically of the medical history of the subject. The timeline could show a time. Corresponding to some or all of the subject's life. The timeline can include information indicating one or several events or conditions, and specifically can include information indicating the start and/or duration of one or several conditions or events impacting the subject's life and/or health.

When the timeline and the avatar are generated, the viewing user can zoom in or zoom out on one or both of the timeline and the avatar. In some embodiments, by zooming in, the user can receive more information and/or more detailed information relating to the subject's life, events in the subject's life, and/or conditions impacting the subject's life. Further, the viewing user can update the subject's profile by adding events, conditions, ailments, injuries, or the like to either the timeline or to the avatar. If the viewing user adds an event, condition, ailment, injury, or the like to one of the timeline or to the avatar, then the user is prompted to add the same to the other of the timeline or to the avatar. In some embodiments in which the viewing user adds an event to the avatar, the user can be prompted to add that same event to the timeline via a request for the approximate date of the event, condition, ailment, injury, or the like. Alternatively, in embodiments in which the viewing user adds an event to the timeline, the user can be prompted to add that same event to the avatar via a request for the location of the subject's body impacted by that event.

In some embodiments, the identification of the one or several avatar containers and/or the one or several timeline containers can occur as outlined, for example in processes 800 and 900, or with reference to FIG. 6, via selection and execution of one or several workflows and/or policy 604 associated with the page of the selected user. In some embodiments, the relevant containers and/or data can be identified by the server 101.

The relevant containers and/or data are retrieved and/or customized. In some embodiments, these containers and/or data can be customized based on characteristics of the viewing user for which the page and/or view is being prepared, characteristics of the subject, or the like. In some embodiments, for example, a viewing user having a lower qualification level may receive a customization decreasing the complexity of narratives shown in the page and/or in one or several containers, whereas a viewing user with a higher qualification level may receive a customization increasing the complexity of narratives. In some embodiments, the customization of the timeline and/or avatar can include matching the timeline and/or avatar to the subject's profile.

At block 1510, container workflows and/or policies for each of the avatar container(s) and the timeline container(s) are identified and executed. In doing this, the server 101 can identify these workflows and/or policies in one of the servers such as in the content server 12, can retrieved these workflows and/or policies, and can then execute them. As part of the execution of the workflows and/or policies, the server 101 can identify and retrieve avatar data and/or timeline data as indicated in block 1512 from one or more of the servers including, for example, the content server 12, the database server 14, and/or the user data server 20. In some embodiments, this can occur as outlined, for example in processes 800 and 900, or with reference to FIG. 6, via selection and/or execution of one or several workflows and/or policy 608 associated with the retrieved containers. In some embodiments, the relevant controls and/or data can be identified by the server 101.

At block 1514 one or both of the avatar and/or timeline are customized. In some embodiments, the avatar and/or the timeline are customized based on, for example, the identity of the viewing user and/or of the subject, one or several attributes of the viewing user and/or of the subject, location, time, or the like. In some embodiments, the customization of the avatar and/or the timeline can include, for example, modification of container data to be displayed to the viewing user, modification the format of the container data to be displayed to the viewing user, modification of functionality of one or several controls associated with the avatar and/or timeline, modification of the inclusion of one or several controls, or the like. In some embodiments, the customization can include changing which events, conditions, ailments, symptoms, injuries, pains, sensations, or the like are shown in the timeline and/or on the avatar. In some embodiments, for example, a viewing user may not have permission to view all of the events, conditions, ailments, symptoms, injuries, pains, sensations, or the like, and thus the avatar and/or timeline can be customized to only show those events, conditions, ailments, symptoms, injuries, pains, sensations, or the like that the viewing user is allowed to view. In some embodiments, the customization of the avatar and/or timeline can be performed at the container level. In some embodiments, the customization can be performed by the server 101.

The customized avatar and/or timeline can be retrieved. In some embodiments, these can be retrieved by the server 101. At block 1516, the visualization tool view is customized based on the customized containers, controls, data, and/or launched pages, and specifically based on the customized avatar and/or timeline. In some embodiments, generating a custom view can include combining the customized containers, controls, data, and launched pages associated with the timeline and/or avatar into the custom view. The custom visualization tool view can be generated by the server 101.

At block 1518, the custom visualization tool view is rendered. In some embodiments, the rendering of the custom visualization tool view can include the rendering of the custom visualization tool view in HTML. In some embodiments, the rendering of the custom visualization tool view can be performed by the server 101.

Figure 16:
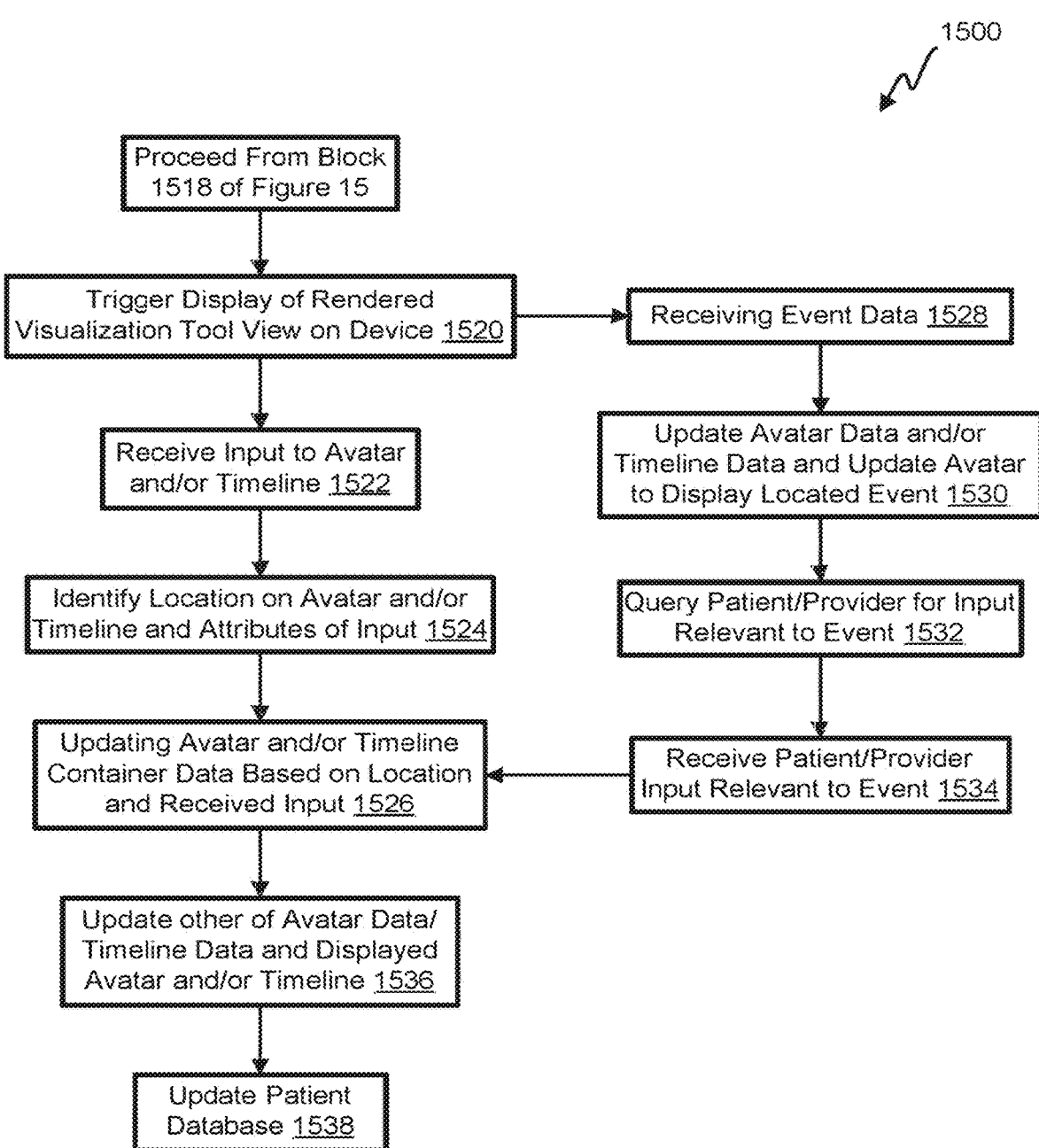
FIG. 16 is a flowchart illustrating a second portion of one embodiment of a process for automated generation of a visualization tool within the customized user interface.

With reference now to FIG. 16, a second part of the process 1500 is shown. The second part of process 1500 continues from block 1518 of FIG. 15. The second part of the process 1500 shows two pathways for updating data relating to the subject. These options include the viewing user inputting an update via the timeline or the avatar, and receiving data indicative of an event and querying the viewing user for input of information relating to that event. The first option is described in steps 1522 through 1526, whereas the second option is described in steps 1528 through 1534.

At block 1520 display of the rendered visualization tool on the device 131 is triggered. In some embodiments, this can include sending the rendered visualization tool to the device 131 via, for example, the communication network 22. Upon receipt of the rendered visualization tool, in some embodiments, the device 131 can display the customized visualization tool.

At block 1522, an input is received via the visualization tool. This input can be received via the timeline and/or via the avatar. The device 131 receives this input and communicates the input with the server 101. In some embodiments, this input can comprise receipt of information relating to an event, condition, ailment, symptom, injury, pain, sensation, or the like. This information can include, for example, characterization of the event, condition, ailment, symptom, injury, pain, sensation, or the like, and the location of the same. In some embodiments, this information can further include a time of the event, including, for example, a starting time of the event, a duration of the event, and stopping time of the event, or the like. For example, in the case of a traumatic injury, times associated with the event can include, the time of the occurrence of the traumatic injury, the time of treatment of the injury, the duration of recovery from the treatment and/or injury, and/or the duration of symptoms from the injury. At block 1524, and based on the received input, the location of the event, condition, ailment, symptom, injury, pain, sensation, or the like on the avatar and/or in the timeline, and attributes of the same are identified and/or determined.

At block 1526, and based on the received input and identified location and attributes, the avatar container data and/or the timeline container data is updated. In some embodiments, this can include updating the avatar container data and/or the timeline container data to include the event, condition, ailment, symptom, injury, pain, sensation, or the like, and the attributes and/or location of the same. In some embodiments, the updating of the avatar container data and/or the updating of the timeline container data can include updating one or several databases containing container data, and can include updating the user profile of the subject.

At block 1528, event data is received. In some embodiments, this can be data indicating the occurrence of an event. In some embodiments, this event data can be data relating to an event. The event data can include, for example, data indicating the nature of the event, when the event occurred, effects of the event, or the like. For example, if the event is an injury, this data can indicate when the injury occurred, attributes of the injury such as the severity of the injury, and/or the effects of the injury. The event data can be received, for example, by the server 101 from one or more of the devices 131.

At block 1530, container data is updated. In some embodiments, this container data can be the avatar container data and/or the timeline container data. In some embodiments, this update to the container data can include updating the container data of the avatar and/or the timeline to reflect the existence of the event. At block 1532, the viewing user and/or the subject are queried for the input of relevant information relating to the event. In some embodiments, this relevant information can be any information identifying one or several attributes of the event and/or of the effect of the event. At block 1534, an input is received via the device 131, the input including information relevant to the event. In some embodiments, this input of relevant information can be in response to the querying of the viewing user for that information in block 1532. In some embodiments, the relevant information can be inputted by the user via the device 131, which relevant information can then be provided by the device 131 to the server 101.

At block 1526, and based on the received input and identified location and attributes, the avatar container data and/or the timeline container data is updated. In some embodiments, this can include updating the avatar container data and/or the timeline container data to include the event, condition, ailment, symptom, injury, pain, sensation, or the like, and the attributes and/or location of the same. In some embodiments, the updating of the avatar container data and/or the updating of the timeline container data can include updating one or several databases containing container data, and can include updating the user profile of the subject.

At block 1536, the other of the avatar container data and the timeline container data is updated. In embodiments in which the input was received to the avatar, updating the timeline container data can include requesting and/or receiving information indicative of a time of the event and/or of the start and/or duration of the event. In embodiments in which the input was received to the timeline, updating the avatar container data can include requesting and/or receiving information indicative of a location of the event. In some embodiments, the updating of the other of the avatar container data and the timeline container data can include updating the other of the avatar container data and the timeline container data based on all or portions of, for example, the received inputs, including, for example, the received information indicative of a time of the event, a start of the event, and/or a duration of the event, and/or the received information indicative of the location of the event, or in other words, the part(s) of the subject's body affected by the event and/or manifesting symptoms of the event. At block 1538 a database containing information relating to the subject is updated. In some embodiments, this can include update the user profile for the subject. This user profile can be stored in one of the servers, and specifically can be stored in the user profile database 14 and/or the user data server 20. In some embodiments, the patient database can be updated at the direction and/or under the direction of the server 101.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

We claim:

1. A method for generating a patient health data in a scrum interface, the method comprising:
receiving a request to launch the patient health data in the scrum interface including timelines representing medical history of a patient from a user;
identifying attributes corresponding to the user and the patient for generation of the patient health data in the scrum interface;
identifying a page corresponding to the patient health data in the scrum interface;
executing a workflow corresponding to at least one container associated with the identified page, wherein the execution of the workflow triggers identification and retrieval of container data and identification of at least one control associated with the container;
customizing the container data and the at least one control based on the attributes of at least one of the patient or the user, wherein the customizing comprises real-time modification of patient health data presentation and corresponding control functionality of the at least one control;
generating a customized view of the scrum interface for the identified page based on the customized container data and the at least one control; and
rendering the customized view to a user device of the user.

2. The method of claim 1, wherein the request to launch the patient health data in the scrum interface is received from the user device.

3. The method of claim 1, further comprising receiving information relating to the user, wherein the information relating to the user identifies at least one attribute of the user.

4. The method of claim 1, wherein the attributes corresponding to the user comprises at least one of:
an identity of the user;
a role of the user; and
a location of the user.

5. The method of claim 1, wherein rendering the customized view comprises converting the customized view into HTML.

6. The method of claim 1, further comprises executing the workflow of the identified page.

7. The method of claim 6, wherein executing the workflow of the identified page comprises identifying data of the identified page.

8. A system for generating a patient health data in a scrum interface,
the system comprising:
memory comprising stored instructions; and
at least one processor configured to execute the stored instructions to:
receive a request to launch the patient health data in the scrum interface including timelines representing medical history of a patient from a user;

identify attributes corresponding to the user and the patient for generation of the patient health data in the scrum interface;
identify a page corresponding to the patient health data in the scrum interface;
execute a workflow corresponding to at least one container associated with the identified page, wherein the execution of the workflow triggers identification and retrieval of container data and identification of at least one control associated with the container;
customize the container data and the at least one control based on the attributes of at least one of the patient or the user, wherein the customizing comprises real-time modification of patient health data presentation and corresponding control functionality of the at least one control;
generate a customized view of the scrum interface for the identified page based on the customized container data and the at least one control; and
render the customized view to a user device of the user.

9. The system of claim 8, wherein the request to launch the patient health data in the scrum interface is received from the user device.

10. The system of claim 8, wherein the at least one processor is further configured to receive information relating to the user, wherein the information relating to the user identifies at least one attribute of the user.

11. The system of claim 8, wherein the attributes corresponding to the user comprises at least one of:
an identity of the user;
a role of the user; and
a location of the user.

12. The system of claim 8, wherein rendering the customized view comprises converting the customized view into HTML.

13. The system of claim 8, wherein the at least one processor is further configured to execute the workflow of the identified page.

14. The system of claim 8, wherein executing the workflow of the identified page comprises identifying data of the identified page.

15. A computer-program product tangibly embodied in a non-transitory machine-readable storage medium, including instructions configured to cause a computing device to generate a patient health data in a scrum interface, including:
receiving a request to launch the patient health data in the scrum interface including timelines representing medical history of a patient from a user;
identifying attributes corresponding to the user and the patient for generation of the patient health data in the scrum interface;
identifying a page corresponding to the patient health data in the scrum interface;
executing a workflow corresponding to at least one container associated with the identified page, wherein the execution of the workflow triggers identification and retrieval of container data and identification of at least one control associated with the container;
customizing the container data and the at least one control based on the attributes of at least one of the patient or the user, wherein the customizing comprises real-time modification of patient health data presentation and corresponding control functionality of the at least one control;

generating a customized view of the scrum interface for the identified page based on the customized container data and the at least one control; and rendering the customized view to a user device of the user.

16. The computer-program product of claim 15, wherein the request to launch the patient health data in the scrum interface is received from the user device.

17. The computer-program product of claim 15, further comprising receiving information relating to the user, wherein the information relating to the user identifies at least one attribute of the user.

18. The computer-program product of claim 15, wherein the attributes corresponding to the user comprises at least one of:

an identity of the user;

a role of the user; and a location of the user.

19. The computer-program product of claim 15, wherein rendering the customized view comprises converting the customized view into HTML.

20. The computer-program product of claim 15, further comprises executing the workflow of the identified page.

\* \* \* \* \*